(12) United States Patent
Kobayakawa et al.

(10) Patent No.: US 10,538,343 B2
(45) Date of Patent: Jan. 21, 2020

(54) VERTICAL TAKE-OFF AND LANDING SPACECRAFT AND METHOD OF CONTROLLING VERTICAL TAKE-OFF AND LANDING SPACECRAFT

(71) Applicants: MITSUBISHI HEAVY INDUSTRIES, LTD., Tokyo (JP); National University Corporation Nagoya University, Aichi (JP)

(72) Inventors: Toyonori Kobayakawa, Tokyo (JP); Noboru Sakamoto, Aichi (JP); Yuta Habaguchi, Aichi (JP)

(73) Assignees: MITSUBISHI HEAVY INDUSTRIES, LTD., Tokyo (JP); NATIONAL UNIVERSITY CORPORATION NAGOYA UNIVERSITY, Aichi (JP)

( * ) Notice: Subject to any disclaimer, the term of this patent is extended or adjusted under 35 U.S.C. 154(b) by 430 days.

(21) Appl. No.: 15/504,867

(22) PCT Filed: Aug. 24, 2015

(86) PCT No.: PCT/JP2015/073738
§ 371 (c)(1),
(2) Date: Feb. 17, 2017

(87) PCT Pub. No.: WO2016/047343
PCT Pub. Date: Mar. 31, 2016

(65) Prior Publication Data
US 2017/0267379 A1    Sep. 21, 2017

(30) Foreign Application Priority Data

Sep. 26, 2014    (JP) .................................. 2014-196412

(51) Int. Cl.
*B64G 1/40* (2006.01)
*B64G 1/24* (2006.01)
(Continued)

(52) U.S. Cl.
CPC ............... *B64G 1/40* (2013.01); *B64G 1/244* (2019.05); *F02K 9/76* (2013.01); *F02K 9/80* (2013.01); *F02K 9/96* (2013.01)

(58) Field of Classification Search
CPC .......... B64G 1/40; B64G 1/244; B64G 1/002; B64G 1/52; B64G 1/62; B64G 1/288;
(Continued)

(56) References Cited

U.S. PATENT DOCUMENTS 3,136,499 A    6/1964 Kessler
6,471,159 B1 *  10/2002 Bundo .................... B64B 1/06
                                                                  244/25
(Continued)

FOREIGN PATENT DOCUMENTS

CN    102114914    7/2011
GB    1074660    *  7/1967
(Continued)

OTHER PUBLICATIONS

Machine translation of Shinohara et al. (JP Pub No. 2004-082,999 A) Pub date Mar. 18, 2004, listed in IDS (Year: 2004).*
(Continued)

*Primary Examiner* — Rodney A Bonnette
(74) *Attorney, Agent, or Firm* — Wenderoth, Lind & Ponack, L.L.P.

(57) ABSTRACT

A vertical take-off and landing spacecraft includes a body, a plurality of engines provided in the body to produce a jet flow and generate thrust, an abnormal signal acquiring unit that acquires an abnormal signal indicative of a presence of an abnormal engine among the plurality of engines, and an engine control unit that outputs a stop signal that stops a specific engine among a plurality of operating engines based on the abnormal signal.

12 Claims, 17 Drawing Sheets

(51) Int. Cl.
*F02K 9/76* (2006.01)
*F02K 9/80* (2006.01)
*F02K 9/96* (2006.01)

(58) Field of Classification Search
CPC ..... F02K 9/76; F02K 9/80; F02K 9/90; F02K 9/96; F05D 2220/90
See application file for complete search history.

(56) References Cited

U.S. PATENT DOCUMENTS

| | | | |
|---|---|---|---|
| 8,678,321 | B2 | 3/2014 | Bezos et al. |
| 2008/0208398 | A1 | 8/2008 | Delaplace et al. |
| 2011/0168835 | A1 | 7/2011 | Oliver |
| 2012/0179308 | A1* | 7/2012 | Peters .................. B64C 15/02 701/13 |

FOREIGN PATENT DOCUMENTS

| | | |
|---|---|---|
| JP | 2002-347698 | 12/2002 |
| JP | 2004-82999 | 3/2004 |
| JP | 2009-507700 | 2/2009 |
| JP | 2012-530020 | 11/2012 |

OTHER PUBLICATIONS

Machine translation of Ishigaki et al. (JP Pub No. 2002-347,698 A) Pub date Dec. 4, 2002, listed in IDS (Year: 2002).*
International Search Report dated Nov. 17, 2015 in corresponding International Application No. PCT/JP2015/073738.
Yoshio Umemura et al., "Nonlinear Optimal Control Design for Practical Use: Based on Invariant Manifold Computation (Advanced Theory for Analysis and Control of Nonlinear Systems)", The Institute of Systems, Control and Information Engineers, vol. 7, No. 13, pp. 1-6 (with concise explanation of relevance), Pub date 1996.
Satoshi Yamagishi et al., "Flight Control Design for Prevention of PIO Using Nonlinear Optimal Control", Journal of the Japan Society for Aeronautical and Space Sciences, vol. 61, No. 1, pp. 1-8 (with English abstract), Pub Date 2013.
Written Opinion of the International Searching Authority dated Nov. 17, 2015 in corresponding International Application No. PCT/JP2015/073738.

* cited by examiner

VERTICAL TAKE-OFF AND LANDING SPACECRAFT AND METHOD OF CONTROLLING VERTICAL TAKE-OFF AND LANDING SPACECRAFT

FIELD

The present invention relates to a vertical take-off and landing spacecraft, and a method of controlling the vertical take-off and landing spacecraft.

BACKGROUND

An aircraft has a plurality of moving parts such as a rudder surface and a thrust deflection nozzle. When the aircraft having the moving parts is linearly controlled, robustness may be insufficient. In order to improve the robustness, an application of nonlinear optimal control is considered. In order to achieve the nonlinear optimal control, it is necessary to solve the Hamilton-Jacobi's equation which is nonlinear expansion of Riccati equation. As one of solutions of the Hamilton-Jacobi equation, a stable manifold method as disclosed in Non Patent Literature 1 and Non Patent Literature 2 is known.

CITATION LIST

Non Patent Literature

Non Patent Literature 1: The Institute of Systems, Control and Information Engineers "System/Control/Information" Vol. 7, No. 13, pp. 1-6, 1996

Non Patent Literature 2: Journal of Japan Society for Aeronautical and Space Sciences, Vol. 61, No. 1, pp. 1-8, 2013

SUMMARY

Technical Problem

Like an aircraft, the vertical take-off and landing spacecraft also has moving parts such as thrust deflection nozzles. The vertical take-off and landing spacecraft has an engine such as a rocket engine that produces a jet flow to generate thrust. The engine is movable with respect to a body of the vertical take-off and landing spacecraft by a gimbal device. As the direction of the engine is adjusted, the thrust deflection is performed. As the direction of the engine is adjusted, the posture of the vertical take-off and landing spacecraft is adjusted. The vertical take-off and landing spacecraft vertically take off and land by adjusting the directions of a plurality of engines.

When a single engine is provided on the body of the vertical take-off and landing spacecraft, if an abnormality occurs in the engine, serious troubles occur in taking-off and landing. Even when a plurality of engines is provided on the body of the vertical take-off and landing spacecraft, if an abnormality occurs in any one of the plurality of engines during flight of the vertical take-off and landing spacecraft, even when the stable manifold method is used, there is a possibility of failing to perform a good posture control in the vertical take-off and landing spacecraft. Further, the abnormal state of the engine includes at least one of a state in which no jet flow is produced from the engine, and a state in which it is not possible to adjust the direction of the engine.

For example, when one of a plurality of engines fails and does not produce a jet flow, the thrust balance is deteriorated. As a result, the vertical take-off and landing spacecraft may not be able to maintain a desired posture.

An object of an aspect of the present invention is to provide a vertical take-off and landing spacecraft capable of landing, while maintaining a desired posture even if an abnormality occurs in any one of a plurality of engines during flight, and a method of controlling the vertical take-off and landing spacecraft.

Solution to Problem

In a first aspect of a present invention, a vertical take-off and landing spacecraft includes a body, a plurality of engines provided in the body to produce a jet flow and generate thrust, an abnormal signal acquiring unit configured to acquire an abnormal signal indicative of a presence of an abnormal engine among the plurality of engines, and an engine control unit configured to output a stop signal which stops a specific engine among a plurality of operating engines based on the abnormal signal.

According to the first aspect of the present invention, when an abnormality occurs in any one of a plurality of engines, since a predetermined specific engine among a plurality of operating engines is stopped, deterioration of balance of thrust is suppressed. Therefore, the vertical take-off and landing spacecraft can land, while maintaining a desired posture. That is, the present inventor has found that, in a situation in which an abnormality occurs in any one of the plurality of engines and it is difficult to perform the favorable posture control even if the stable manifold method is used, it is possible to perform the favorable posture control method, by intentionally stopping the normal engine located at the position corresponding to the abnormal engine. The abnormality of the engine includes at least one of a situation in which no jet flow is produced from the engine including a failure of the engine, and a situation in which it is not possible to adjust the direction of the engine.

In the first aspect of the present invention, the engines may be disposed around a central axis of the body, and the engine control unit may output the stop signal so that the central axis of the body is orthogonal to the ground.

As a result, the vertical take-off and landing spacecraft can land perpendicularly to the ground.

In the first aspect of the present invention, the engines may include a first engine and a second engine disposed on both sides of the central axis of the body, and when an abnormal signal indicative of an abnormality of the first engine is acquired during operation of an engine other than the first engine and the second engine, the engine control unit may output a stop signal which stops the second engine.

As a result, both of the first engine and the second engine disposed on both sides of the central axis of the body do not generate a jet flow. The jet flow is generated by an engine other than the first engine and the second engine. Therefore, the vertical take-off and landing spacecraft can land, while maintaining a desired posture, and while suppressing imbalance of thrust.

In the first aspect of the present invention, a distance between the central axis of the body and the first engine may be equal to a distance between the central axis of the body and the second engine.

As a result, both of the first engine and the second engine disposed point-symmetrically with respect to the central axis of the body do not generate a jet flow. Therefore, the vertical take-off and landing spacecraft can land, while maintaining a desired posture, and while suppressing imbalance of thrust. For example, when there are four engines provided on the body, it is preferable that the engines are symmetrically disposed.

In the first aspect of the present invention, the other engine may be disposed between the first engine and the second engine.

As a result, thrust is obtained by another engine disposed on the central axis of the body. Therefore, the vertical take-off and landing spacecraft can land, while maintaining a desired posture, and while suppressing imbalance of thrust.

In the first aspect of the present invention, the engines may include a first engine, a second engine and a third engine which are disposed around the central axis of the body at equal intervals, and when an abnormal signal indicative of an abnormality of the first engine is acquired during operation of an engine other than the first engine, the second engine and the third engine, the engine control unit may output a stop signal which stops the second engine and the third engine.

Thus, each of the first engine, the second engine, and the third engine disposed around the central axis of the body at equal intervals does not generate a jet flow. The jet flow is generated by an engine other than the first engine, the second engine and the third engine. Therefore, the vertical take-off and landing spacecraft can land, while maintaining a desired posture, and while suppressing imbalance of thrust.

In the first aspect of the present invention, a plurality of other engines may be disposed to surround the central axis of the body.

Thus, a well-balanced thrust can be obtained by the jet flow generated by each of the plurality of engines disposed to surround the central axis of the body.

In the first aspect of the present invention, at least two engines of other engines may be disposed point-symmetrically with respect to the central axis of the body.

Thus, a well-balanced thrust can be obtained by the jet flow generated by the engine disposed point-symmetrically with respect to the central axis of the body.

In the first aspect of the present invention, the vertical take-off and landing spacecraft may further include a gimbal device which is provided in each of the plurality of engines and includes an actuator capable of adjusting the direction of the engine, and an actuator control unit configured to control the actuator. The actuator control unit may control the actuator of the normally operating engine different from the abnormal engine and the engine stopped by the stop signal, so that the central axis of the body and the ground are orthogonal to each other.

As a result, since the direction of the engine generating the jet flow is adjusted, the vertical take-off and landing spacecraft can land, while maintaining a desired posture.

In the first aspect of the present invention, the vertical take-off and landing spacecraft may further include a rudder angle data acquiring unit configured to acquire rudder angle data indicative of an angle formed between an axis parallel to a central axis of the body and the central axis of the engine, a posture angle data acquiring unit configured to acquire posture angle data indicative of an angle formed between a reference axis orthogonal to the ground and the central axis of the body, and a posture angular velocity data acquiring unit configured to acquire posture angular velocity data indicative of an angular velocity of the central axis of the body. The actuator control unit may output a rudder angle signal for adjusting the direction of the engine, based on the rudder angle data, the posture angle data, and the posture angular velocity data.

Thus, since the direction of the engine is adjusted based on the rudder angle, the posture angle, and the posture angular velocity, the vertical take-off and landing spacecraft can land, while maintaining a desired posture.

In a second aspect of a present invention, a method of controlling a vertical take-off and landing spacecraft includes acquiring an abnormal signal which acquires an abnormal signal indicative of a presence of an abnormal engine among a plurality of engines provided in a body of the vertical take-off and landing spacecraft which produces a jet flow and generates a thrust, and outputting a stop signal for stopping a specific engine among a plurality of operating engines based on the abnormal signal.

According to the second aspect of the present invention, when an abnormality occurs in any one of a plurality of engines, since a predetermined specific engine among a plurality of operating engines is stopped, the deterioration of the thrust balance is suppressed. Therefore, the vertical take-off and landing spacecraft can land, while maintaining a desired posture.

Advantageous Effects of Invention

According to an aspect of the present invention, there is provided a vertical take-off and landing spacecraft capable of landing, while maintaining a desired posture even if an abnormality occurs in one of a plurality of engines during flight, and a method of controlling the vertical take-off and landing spacecraft.

DESCRIPTION OF EMBODIMENTS

Hereinafter, embodiments of the present invention will be described with reference to the drawings, but the present invention is not limited thereto. Constituent elements of each embodiment described below can be appropriately combined with each other. Also, some constituent elements may not be used.

In the following description, an XYZ orthogonal coordinate system as a global coordinate system is set, and a positional relation of each part will be described with reference to the XYZ orthogonal coordinate system. A direction parallel to a first axis in a horizontal plane is set as an X-axis direction, a direction parallel to a second axis orthogonal to the first axis in the horizontal plane is set as an Y-axis direction, and a direction parallel to a third axis orthogonal to the horizontal plane is set as a Z-axis direction. Further, the rotational (inclination) directions around the X-axis (the first axis), the Y-axis (the second axis) and the Z-axis (the third axis) are defined as θX, θY, and θZ directions, respectively. The horizontal plane includes the X-Y plane. The Z-axis direction is a vertical direction. In the present embodiment, the ground and the X-Y plane are assumed to be parallel to each other.

<First Embodiment>

Figure 1:
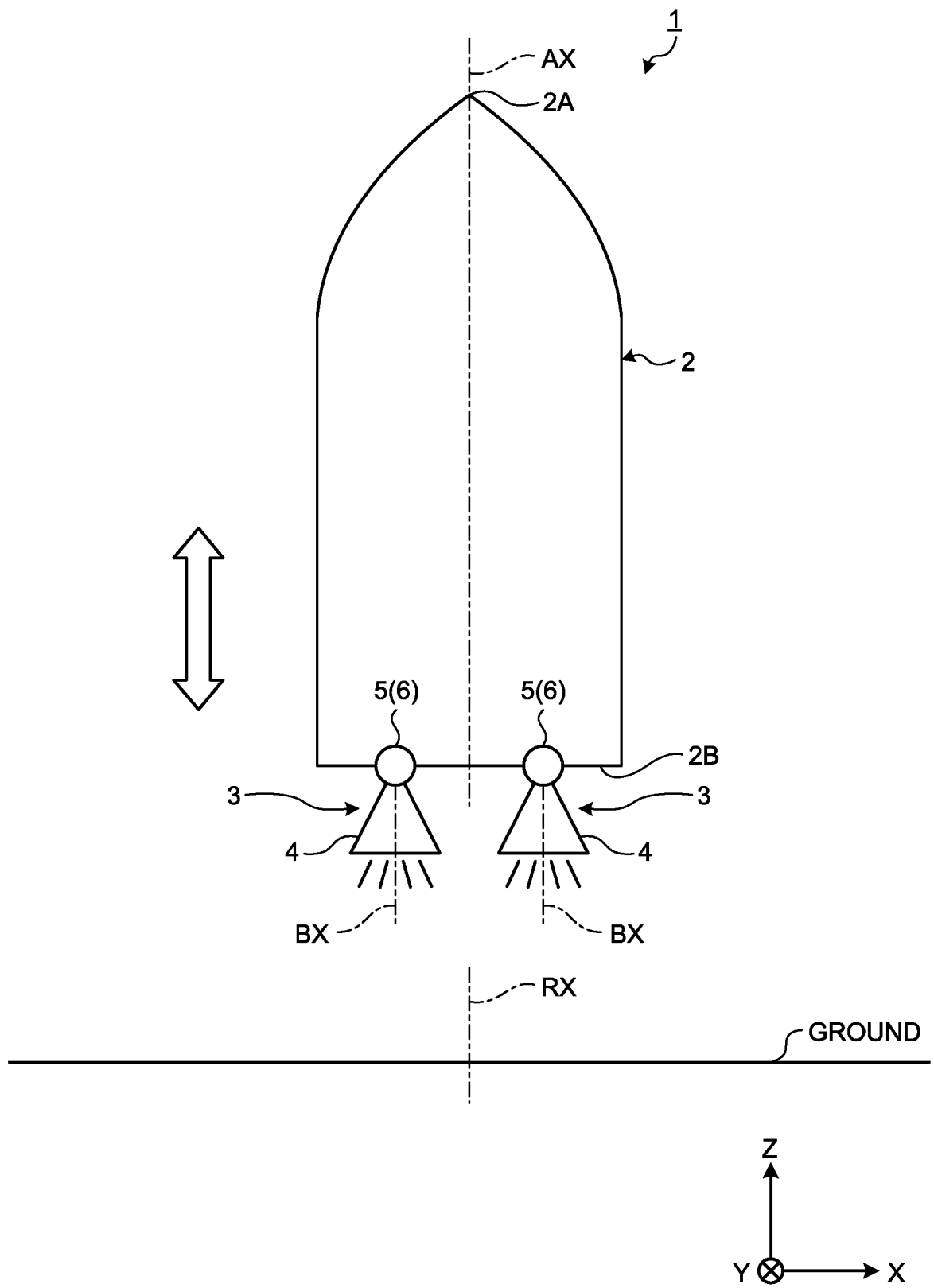
FIG. 1 is a schematic diagram illustrating an example of a vertical take-off and landing spacecraft according to a first embodiment.

A first embodiment will be described. FIG. 1 is a schematic diagram illustrating an example of a vertical take-off and landing spacecraft 1 according to this embodiment. The vertical take-off and landing spacecraft 1 can take off and land vertically. Further, the vertical take-off and landing spacecraft 1 can take off and land obliquely. In the present embodiment, the vertical take-off and landing spacecraft 1 is movable in the Z-axis direction with respect to the ground. The vertical take-off and landing spacecraft 1 is used at least as a part of a space transportation system, for example. The vertical take-off and landing spacecraft 1 can take off and land on a planet such as Mars. The vertical take-off and landing spacecraft 1 can take off and land on a satellite such as moon. The vertical take-off and landing spacecraft 1 may be used as a planetary probe or a satellite probe.

As illustrated in FIG. 1, the vertical take-off and landing spacecraft 1 includes a body 2, and a plurality of engines 3 which is provided in the body 2 to produce a jet flow and generate thrust. The engine 3 includes a rocket engine.

The vertical take-off and landing spacecraft 1 is repeatedly reused. That is, the vertical take-off and landing spacecraft 1 is a so-called reusable vertical take-off and landing rocket. The vertical take-off and landing spacecraft 1 may have blades, and may have fins or may not have fins. By reusing the vertical take-off and landing spacecraft 1, transportation costs can be reduced. In the following description, the vertical take-off and landing spacecraft 1 will be appropriately referred to as a vertical take-off and landing rocket 1.

The body 2 has a nose part (upper part) 2A and a base part (lower part) 2B. The body 2 is disposed around the central axis AX. The engine 3 is provided in the base part 2B. The engine 3 includes thrust deflection nozzles 4.

The vertical take-off and landing rocket 1 has gimbal devices 5 which are provided in each of the plurality of engines 3 and capable of adjusting the directions of the engines 3. The gimbal device 5 includes a gimbal mechanism which supports the engine 3, and an actuator 6 which moves the engines 3 supported by the gimbal mechanism to adjust the directions of the engines 3.

Figure 2:
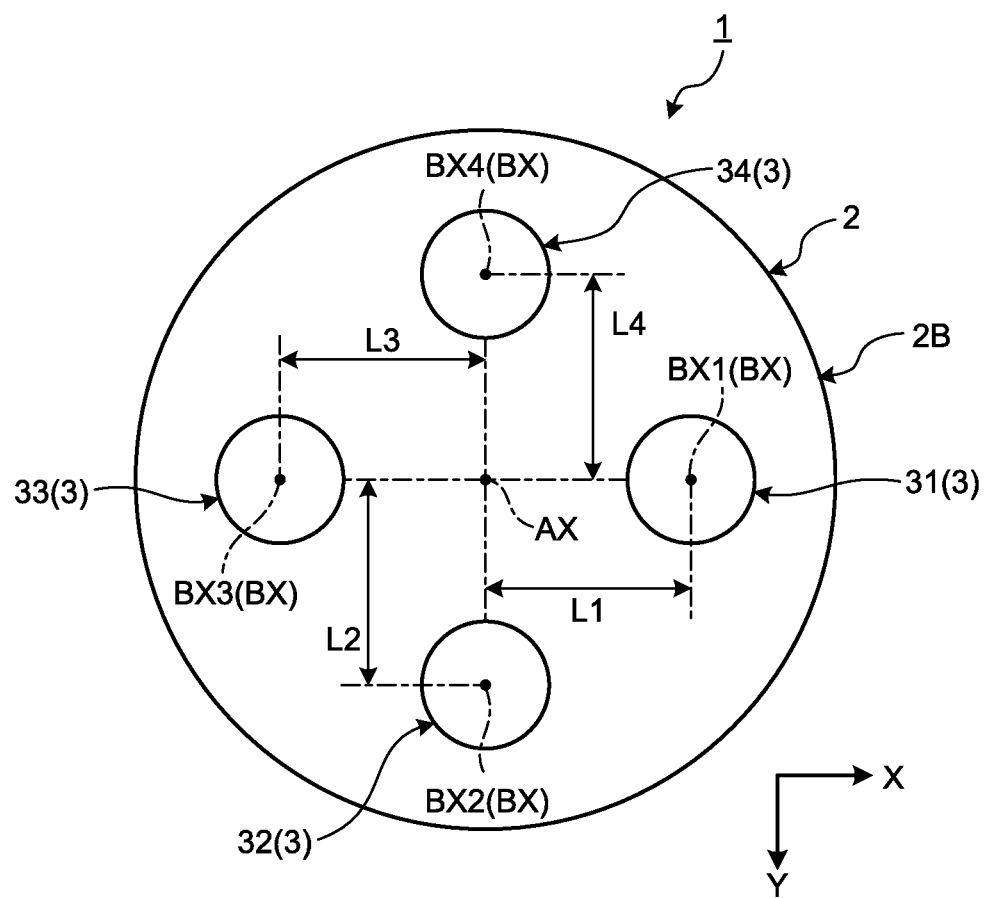
FIG. 2 is a diagram of an example of the vertical take-off and landing spacecraft according to the first embodiment as seen from a base part side.

FIG. 2 is a diagram of an example of the vertical take-off and landing rocket 1 according to the present embodiment as seen from the base part 2B side. As illustrated in FIG. 1 and FIG. 2, a plurality of engines 3 is disposed around the central axis AX of the body 2. In the present embodiment, four engines 3 are disposed around the central axis AX. In the following description, each of the four engines 3 is appropriately referred to as an engine 31, an engine 32, an engine 33 and an engine 34.

The plurality of engines 3 (the engine 31, the engine 32, the engine 33 and the engine 34) are disposed around the central axis AX at regular intervals. The engine 31 and the engine 33 are disposed on both sides of the central axis AX in the X-axis direction. The engine 31 is disposed on the +X side of the central axis AX. The engine 33 is disposed on the −X side of the central axis AX. The engine 32 and the engine 34 are disposed on both sides of the central axis AX in the Y-axis direction. The engine 32 is disposed on the +Y side of the central axis AX. The engine 34 is disposed on the −Y side of the central axis AX.

In the present embodiment, a distance L1 between the central axis AX of the body 2 and the engine 31 is equal to a distance L3 between the central axis AX of the body 2 and the engine 33. The distance L2 between the central axis AX of the body 2 and the engine 32 is equal to the distance L4 between the central axis AX of the body 2 and the engine 34. The distance L1, the distance L3, the distance L2 and the distance L4 are equal to one another.

In the present embodiment, the distance L1 is a distance between the central axis AX of the body 2 and a central axis BX1 of the engine 31 disposed at the initial position. The distance L2 is a distance between the central axis AX of the body 2 and a central axis BX2 of the engine 32 disposed at the initial position. The distance L3 is a distance between the central axis AX of the body 2 and a central axis BX3 of the engine 33 disposed at the initial position. The distance L4 is a distance between the central axis AX of the body 2 and a central axis BX4 of the engine 34 disposed at the initial position.

In the following description, the central axis BX1 of the engine 31, the central axis BX2 of the engine 32, the central axis BX3 of the engine 33, and the central axis BX4 of the engine 34 are collectively referred to as the central axis BX of the engine 3 as appropriate.

In the present embodiment, the initial position of the engine 3 (the engine 31, the engine 32, the engine 33 and the engine 34) refer to a positions (direction) of the engine 3 at which the central axis BX of the engine 3 and the central axis AX of the body 2 are parallel to each other.

That is, in a plane orthogonal to the central axis AX of the body 2, the engine 31 and the engine 33 are disposed point-symmetrically with respect to the central axis AX of the body 2. In the plane orthogonal to the central axis AX of the body 2, the engine 32 and the engine 34 are disposed point-symmetrically with respect to the central axis AX of the body 2.

In this way, in the present embodiment, the four engines 3 are symmetrically disposed.

Figure 3:
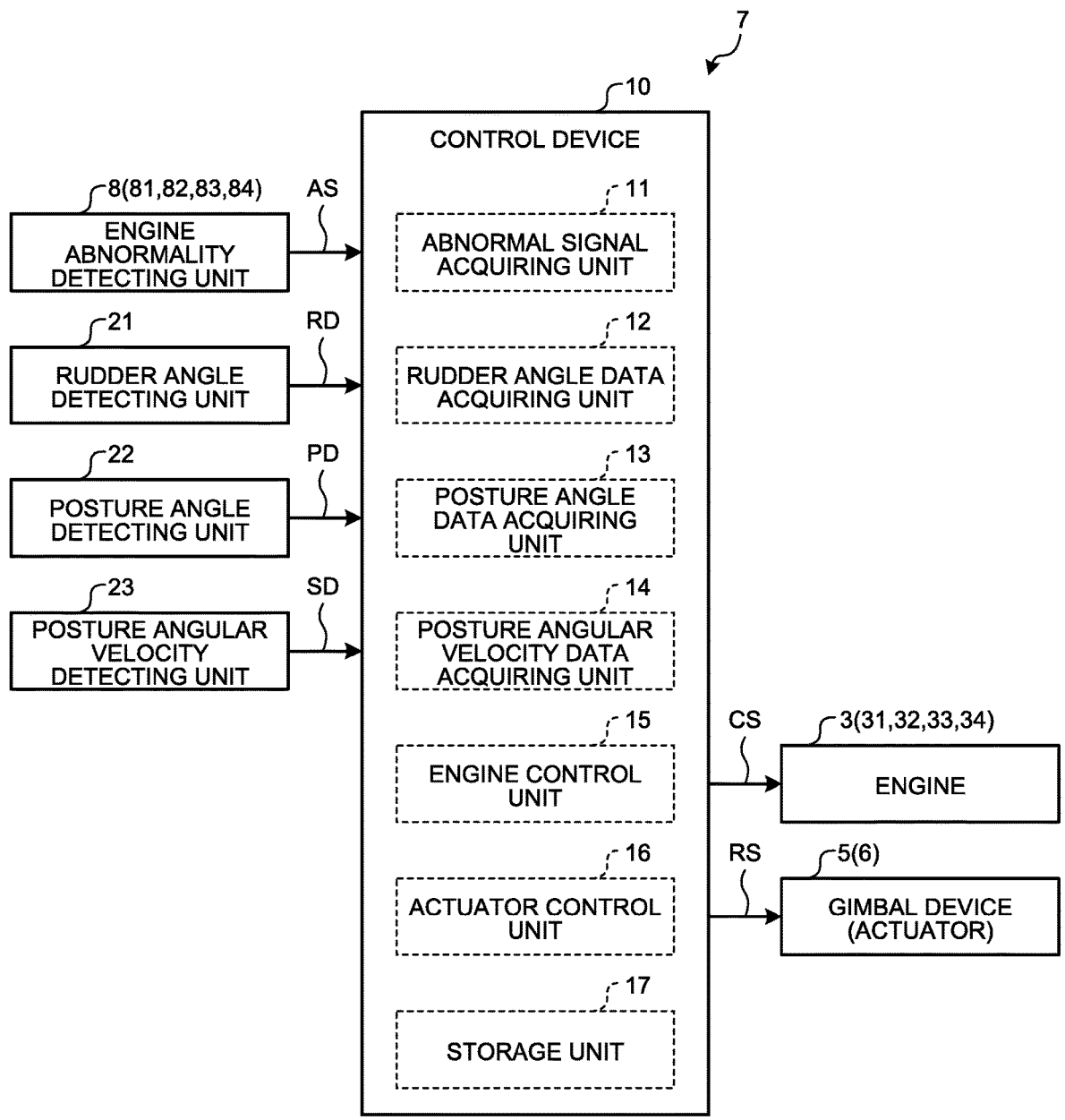
FIG. 3 is a functional block diagram illustrating an example of a control system of the vertical take-off and landing spacecraft according to the first embodiment.

FIG. 3 is a functional block diagram illustrating an example of a control system 7 of the vertical take-off and landing rocket 1 according to this embodiment. As illustrated in FIG. 3, the control system 7 has a control device 10. The control device 10 includes a computer system.

The control device 10 includes an abnormal signal acquiring unit 11 which acquires an abnormal signal AS that indicates the presence of an abnormal engine 3 among a plurality of engines 3, and an engine control unit 15 which outputs a stop signal CS for stopping a specific engine 3 among the plurality of operating engines 3 based on the abnormal signal AS acquired by the abnormal signal acquiring unit 11.

In this embodiment, the abnormal state of the engine includes a state in which the engine fails. The abnormal state of the engine includes one or both of a state in which no jet flow is generated from the engine, and a state in which it is not possible to adjust the direction of the engine.

The control device 10 includes a rudder angle data acquiring unit 12 that acquires a rudder angle data RD indicative of an angle (rudder angle) δ formed between an axis CX parallel to the central axis AX of the body 2 and a central axis BX of the engine 3, a posture angle data acquiring unit 13 that acquires a posture angle data PD indicative of an angle (posture angle) θ formed between a reference axis RX orthogonal to the ground and the central axis AX of the body 2, a posture angular velocity data acquiring unit 14 that acquires a posture angular velocity data SD indicating angular velocity (posture angular velocity) ω of the central axis AX of the body 2, and an actuator control unit 16 that outputs a rudder angle signal RS for controlling the actuator 6.

The control device 10 includes a storage unit 17. The storage unit 17 includes a recording medium such as a ROM, a RAM, and a hard disk. The storage unit 17 stores various data used for controlling the vertical take-off and landing rocket 1.

The control system 7 includes an engine abnormality detecting unit 8 which detects an abnormality of the engine 3, a rudder angle detecting unit 21 which detects the rudder angle δ, a posture angle detecting unit 22 which detects the posture angle θ, and a posture angular velocity detecting unit 23 which detects the posture angular velocity ω.

The engine abnormality detecting unit 8 detects an abnormality of the engine 3 and outputs the abnormal signal AS to the abnormal signal acquiring unit 11. The engine abnormality detecting unit 8 includes an engine abnormality detecting unit 81 which detects an abnormality of the engine 31, an engine abnormality detecting unit 82 which detects an abnormality of the engine 32, an engine abnormality detecting unit 83 which detects an abnormality of the engine 33, and an engine abnormality detecting unit 84 which detects an abnormality of the engine 34. The abnormality of the engine 3 includes failure of the engine 3. The abnormality of the engine 3 includes a situation in which the engine 3 is incapable of generating a jet flow. The abnormality of the engine 3 includes a situation in which it is not possible to adjust the direction (the direction of the jet flow) of the engine 3. When the engine 31 fails, the engine abnormality detecting unit 81 outputs an abnormal signal AS indicative of the failure of the engine 31 to the abnormal signal acquiring unit 11. When the engine 32 fails, the engine abnormality detecting unit 82 outputs an abnormal signal AS indicative of the failure of the engine 32 to the abnormal signal acquiring unit 11. When the engine 33 fails, the engine abnormality detecting unit 83 outputs an abnormal signal AS indicative of the failure of the engine 33 to the abnormal signal acquiring unit 11. When the engine 34 fails, the engine abnormality detecting unit 84 outputs an abnormal signal AS indicative of the failure of the engine 34 to the abnormal signal acquiring unit 11.

The rudder angle detecting unit 21 detects a rudder angle δ which is an angle formed between an axis CX parallel to the central axis AX of the body 2 and the central axis BX of the engine 3, and outputs the rudder angle data RD indicative of the rudder angle δ to the rudder angle data acquiring unit 12. The rudder angle detecting unit 21 is provided in each of the plurality of engines 3 (the engine 31, the engine 32, the engine 33 and the engine 34). The rudder angle detecting unit 21 of the engine 31 detects the rudder angle δ formed between the axis CX parallel to the central axis AX and the central axis BX1, and outputs the rudder angle data RD indicative of the rudder angle δ to the rudder angle data acquiring unit 12. The rudder angle detecting unit 21 of the engine 32 detects the rudder angle δ formed between the axis CX parallel to the central axis AX and the central axis BX2, and outputs the rudder angle data RD indicative of the rudder angle δ to the rudder angle data acquiring unit 12. The rudder angle detecting unit 21 of the engine 33 detects the rudder angle δ formed between the axis CX parallel to the central axis AX and the central axis BX3, and outputs the rudder angle data RD indicative of the rudder angle δ to the rudder angle data acquiring unit 12. The rudder angle detecting unit 21 of the engine 34 detects the rudder angle δ formed between the axis CX parallel to the central axis AX and the central axis BX4, and outputs the rudder angle data RD indicative of the rudder angle δ to the rudder angle data acquiring unit 12.

Figure 4:
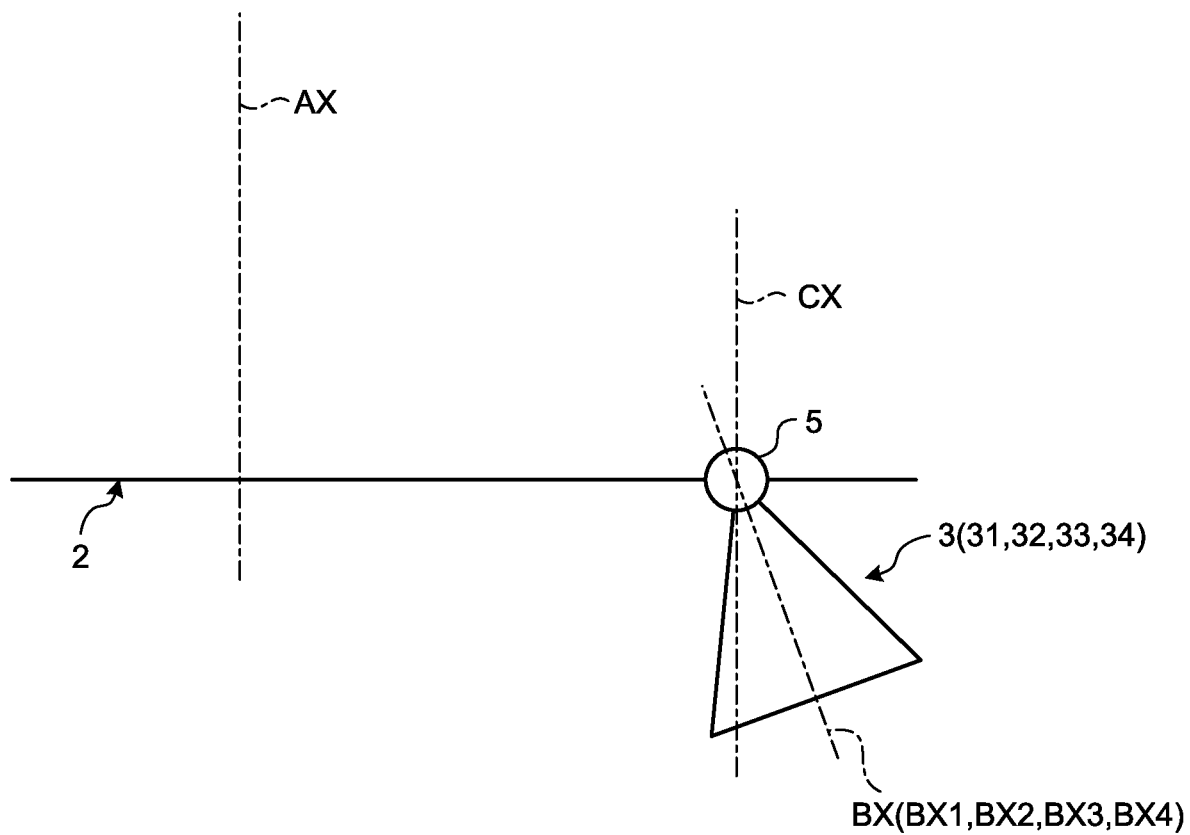
FIG. 4 is a schematic diagram illustrating a rudder angle according to the first embodiment.

FIG. 4 is a schematic diagram illustrating the rudder angle δ according to the present embodiment. The direction of the engine 3 varies depending on the gimbal device 5. As illustrated in FIG. 3, the rudder angle δ is an angle formed between an axis CX parallel to the central axis AX of the body 2 and the central axis BX of the engine 3. That is, in the present embodiment, the rudder angle δ is an angle in a local coordinate system based on the body 2 of the vertical take-off and landing rocket 1. As described above, in the present embodiment, the initial position of the engine 3 refers to a position (direction) of the engine 3 at which the central axis AX of the body 2 and the central axis BX of the engine 3 are parallel to each other. When the engine 3 is disposed at the initial position, the rudder angle δ may be 0 [°] or may not be 0 [°].

The rudder angle δ of the engine 3 is adjusted by the gimbal device 5. In the present embodiment, the gimbal device 5 includes a so-called biaxial gimbal mechanism. By the gimbal device 5, the injection direction of the jet flow generated by the engine 3 can be changed in two directions.

In a plane orthogonal to the central axis AX, the injection direction of the engine 3 can be changed in two directions (a pitch direction and a yaw direction). At least two actuators 6 of the gimbal device 5 are provided for a single engine 3. The actuator 6 of the gimbal device 5 includes a first actuator for moving the engine 3 in the pitch direction, and a second actuator for moving the engine 3 in the yaw direction.

The posture angle detecting unit 22 detects a posture angle θ which is an angle formed between the reference axis RX orthogonal to the ground (X-Y plane) and the central axis AX of the body 2, and outputs the posture angle data PD indicative of the posture angle θ to the posture angle data acquiring unit 13.

Figure 5:
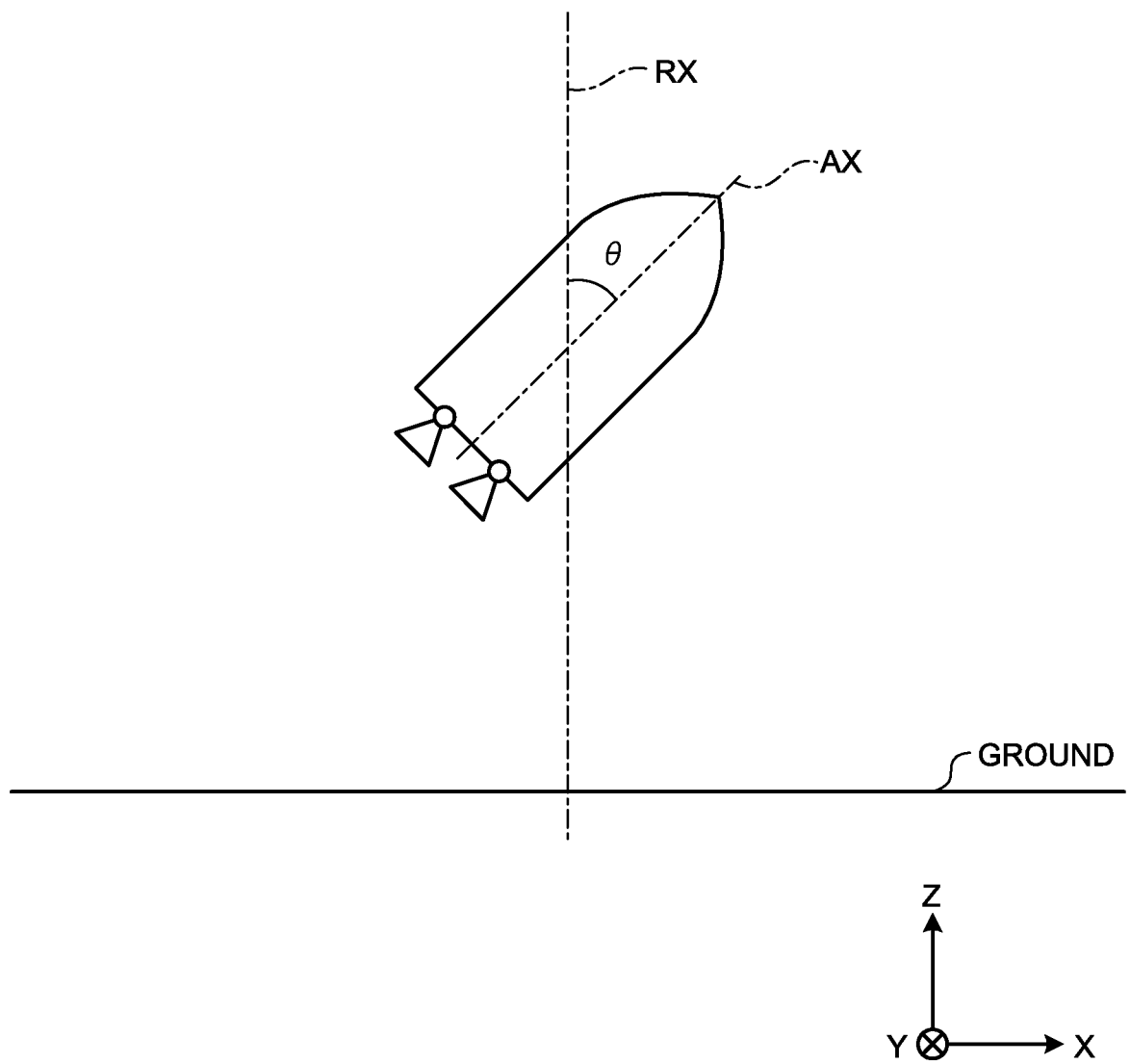
FIG. 5 is a schematic diagram illustrating a posture angle according to the first embodiment.

FIG. 5 is a schematic diagram illustrating the posture angle θ according to the present embodiment. As illustrated in FIG. 5, the posture angle θ is an angle formed between the reference axis RX orthogonal to the ground and the central axis AX of the body 2. That is, in the present embodiment, the posture angle θ is an angle in the global coordinate system based on the ground. When the vertical take-off and landing rocket 1 takes off from the ground or when the vertical take-off and landing rocket 1 lands on the ground, the posture of the vertical take-off and landing rocket 1 is controlled so that the body 2 is in a desired posture (desired take-off and landing posture). The desired posture of the body 2 may be a posture in which the central axis AX and the ground are in an orthogonal posture (a posture in which the reference axis RX and the central axis AX are parallel to each other), or the reference axis RX and the central axis AX may be in a non-parallel posture.

The posture angular velocity detecting unit 23 detects the posture angular velocity ω that is the angular velocity of the body 2 (the central axis AX of the body 2), and outputs the posture angular velocity data SD indicative of the posture angular velocity ω to the posture angular velocity data acquiring unit 14.

In the present embodiment, the posture angular velocity detecting unit 23 includes, for example, a gyro sensor. The detected value of the gyro sensor is output as the posture angular velocity data SD. In the present embodiment, the posture angle data PD which is output from the posture angle detecting unit 22 includes the integral value of the detected value of the gyro sensor.

The engine control unit 15 controls each of the plurality of engines 3. The engine control unit 15 controls each of the plurality of engines 3 so that the body 2 is in a desired posture in the taking-off and landing of the vertical take-off and landing rocket 1. The desired posture of the body 2 may be a posture in which the central axis AX and the ground are orthogonal to each other (the posture angle θ is 0 [°]) or a posture in which the posture angle θ is a predetermined angle other than 0 [°].

The actuator control unit 16 controls each of the plurality of actuators 6 disposed in the plurality of engines 3. The actuator control unit 16 controls each of the plurality of actuators 6 and controls the direction of the engine 3 so that the body 2 is in a desired posture in the taking-off and landing of the vertical take-off and landing rocket 1.

Figure 6:
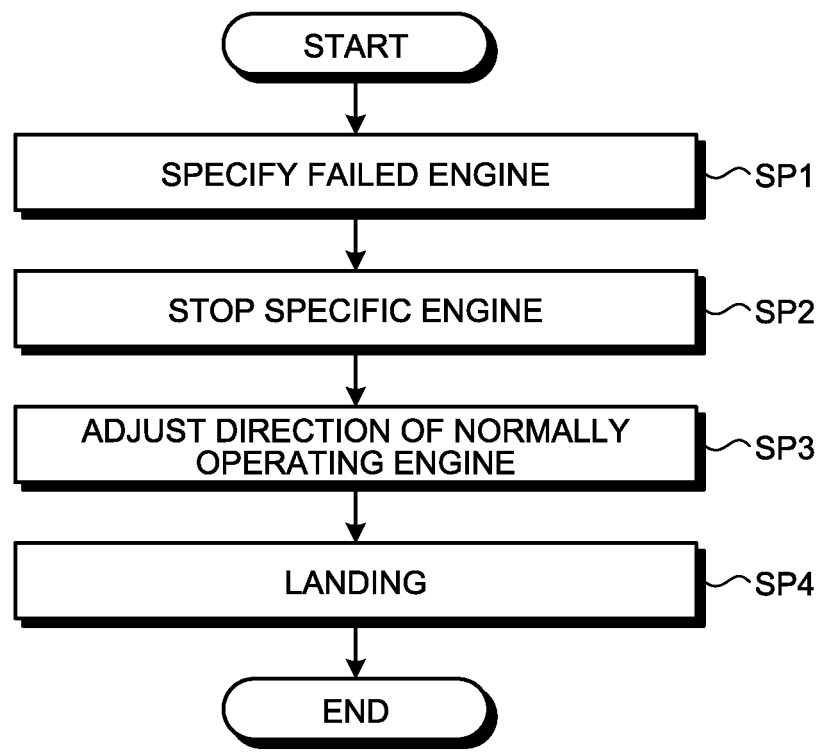
FIG. 6 is a flowchart illustrating an example of a control method of the vertical take-off and landing spacecraft according to the first embodiment.

Next, an example of the control method of the vertical take-off and landing rocket 1 according to the present embodiment will be described with reference to the flowchart of FIG. 6. In the present embodiment, an example of a control method of the vertical take-off and landing rocket 1 at the time of landing of the vertical take-off and landing rocket 1 flying during landing phase is described. As illustrated in FIG. 6, the control method of the vertical take-off and landing rocket 1 includes a step of acquiring the abnormal signal AS indicative of the presence of the abnormal engine 3 among the plurality of engines 3 to specify the failed engine 3 in a state in which the vertical take-off and landing rocket 1 exists during landing phase (step SP1), a step of outputting a stop signal CS for stopping a specific engine 3 among the plurality of operating engines 3 based on the abnormal signal AS to stop the specific engine 3 (step SP2), a step of controlling the actuator 6 of the normally operating engine 3 to adjust the direction of the normally operating engine 3 (step SP3), and a step of landing the vertical take-off and landing rocket 1, while adjusting the direction of the engine 3 (step SP4).

Figure 7:
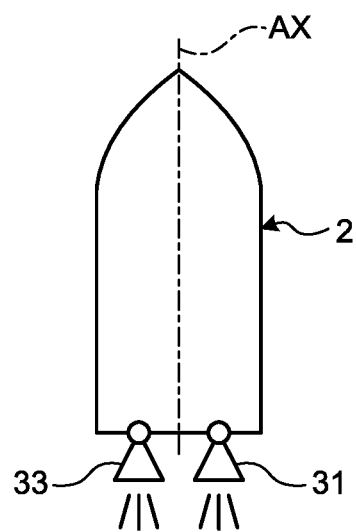
FIG. 7 is a schematic diagram illustrating an example of the control method of the vertical take-off and landing spacecraft according to the first embodiment.
Figure 7:
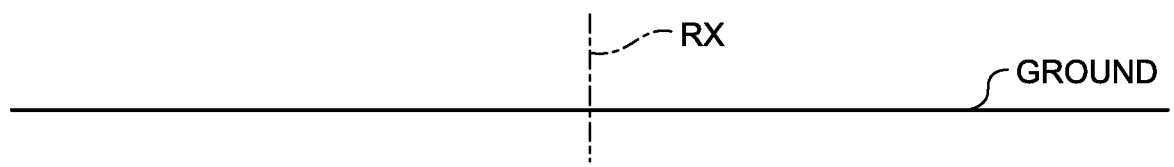
Figure 7:
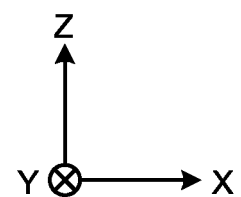
Figure 8:
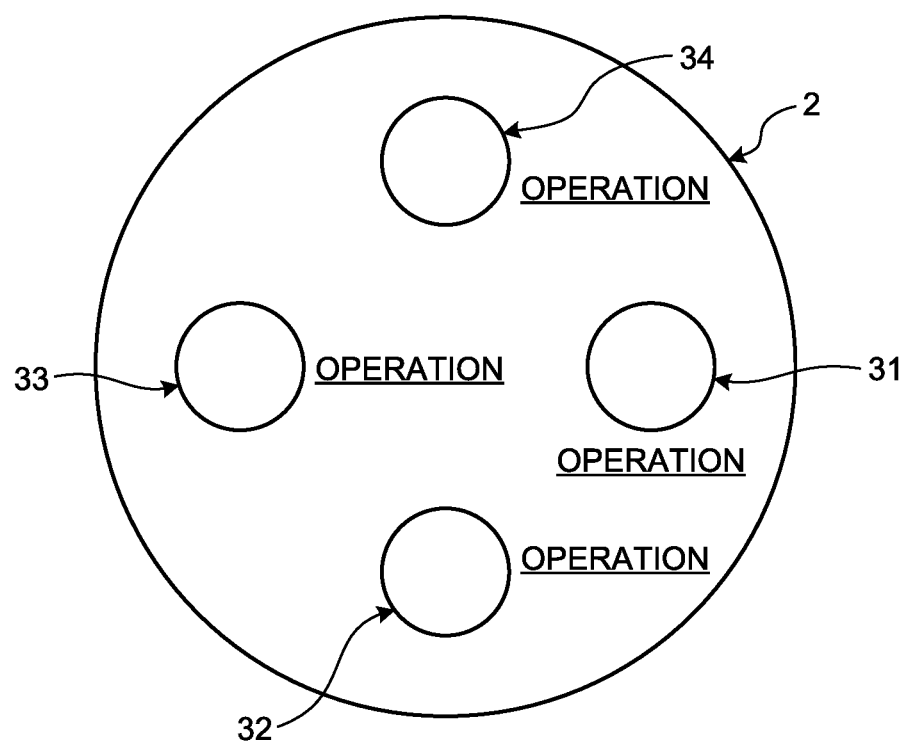
FIG. 8 is a schematic diagram illustrating an example of the control method of the vertical take-off and landing spacecraft according to the first embodiment.

FIGS. 7 and 8 are schematic diagrams illustrating an example of the control method of the vertical take-off and landing rocket 1 according to the present embodiment. FIG. 7 is a side view of the vertical take-off and landing rocket 1. FIG. 8 is a diagram of the vertical take-off and landing rocket 1 as viewed from the base part 2B side. FIGS. 7 and 8 illustrate a state in which the four engines 3 (the engine 31, the engine 32, the engine 33, and the engine 34) are normally operating. When the four engines 3 are operating, the vertical take-off and landing rocket 1 is maintained in a desired posture. The desired posture of the vertical take-off and landing rocket 1 includes a posture in which the central axis AX of the body 2 and the reference axis RX are parallel to each other. Further, the desired posture of the vertical take-off and landing rocket 1 may be a posture in which the central axis AX of the body 2 and the reference axis RX are not parallel to each other at a predetermined angle.

Figure 9:
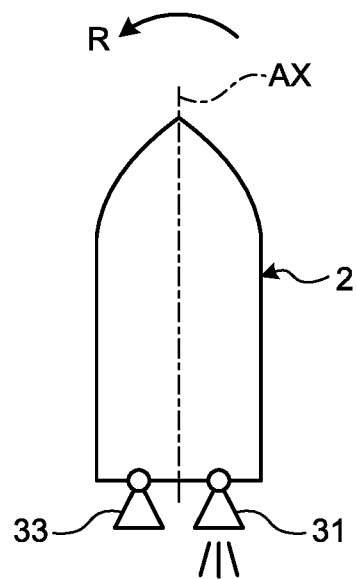
FIG. 9 is a schematic diagram illustrating an example of the control method of the vertical take-off and landing spacecraft according to the first embodiment.
Figure 9:
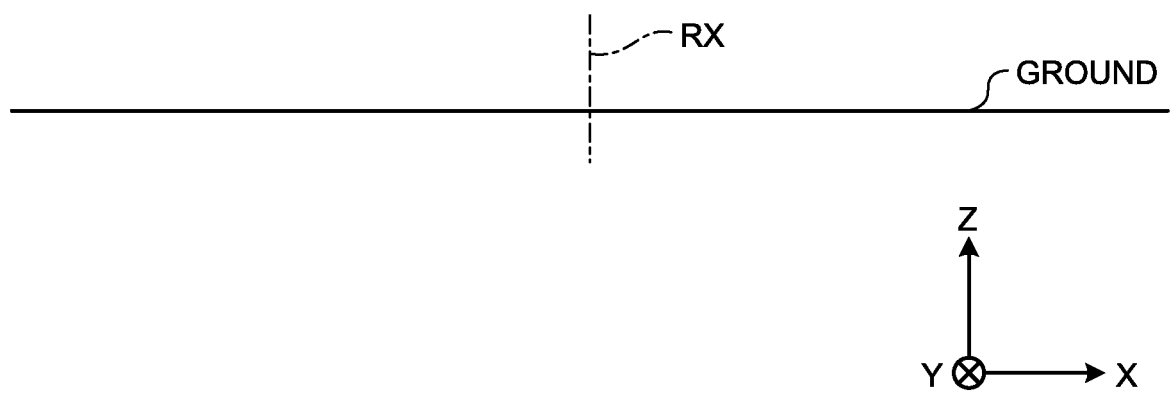
Figure 10:
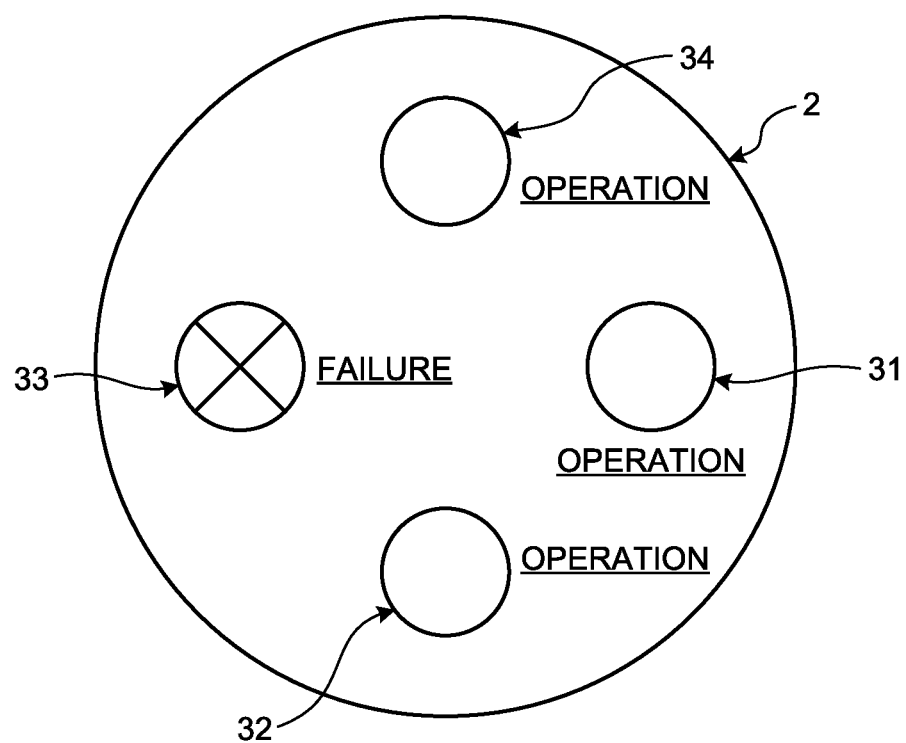
FIG. 10 is a schematic diagram illustrating an example of the control method of the vertical take-off and landing spacecraft according to the first embodiment.

FIGS. 9 and 10 are schematic diagrams illustrating an example of a control method of the vertical take-off and landing rocket 1 according to the present embodiment. FIG. 9 is a side view of the vertical take-off and landing rocket 1. FIG. 10 is a diagram of the vertical take-off and landing rocket 1 as seen from the base part 2B side. As illustrated in FIGS. 9 and 10, for example, it is assumed that the engine 33 fails among the four engines 31, 32, 33 and 34. The engine abnormality detecting unit 8 outputs an abnormal signal AS indicative of the failure of the engine 33 to the abnormal signal acquiring unit 11. The abnormal signal acquiring unit 11 acquires the abnormal signal AS. As a result, among the plurality of engines 3 (the engine 31, the engine 32, the engine 33, and the engine 34), the failed engine 33 is specified (step SP 1).

The engine control unit 15 outputs a stop signal CS for stopping the specific engine 31 among the plurality of operating engines 31, 32, and 34 based on the abnormal signal AS (step SP2). In the present embodiment, when the engine 33 fails, the engine control unit 15 outputs the stop signal CS to the engine 31 so that the engine 31 stops.

In the present embodiment, when a certain engine 3 fails among the plurality of engines 3, index data indicative of stopping which one of the plurality of operating engines 3 is stored in the storage unit 17 in advance. The index data is set so that the body 2 is in a desired posture at the time of landing of the vertical take-off and landing rocket 1. The engine control unit 15 outputs a stop signal CS for stopping the predetermined specific engine 3 so that the body 2 is in a desired posture.

In the present embodiment, when the abnormal signal AS indicative of the abnormality of the engine 33 is acquired during operation of each of the engine 31 and the engine 33, and the engine 32 and the engine 34 other than the engine 31 and the engine 33, the engine control unit 15 outputs the stop signal CS for stopping the engine 31 facing the engine 33 across the central axis AX (step SP2).

That is, when the abnormal signal AS indicative of the abnormality of the engine 33 on one side of the engine 31 and the engine 33 disposed on both sides of the central axis AX is acquired, the engine control unit 15 outputs the stop signal CS for stopping the engine 31 on the other side.

Figure 11:
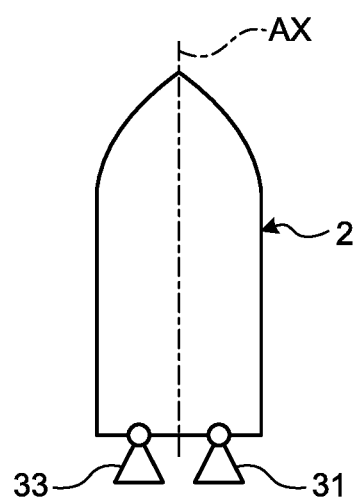
FIG. 11 is a schematic diagram illustrating an example of the control method of the vertical take-off and landing spacecraft according to the first embodiment.
Figure 11:
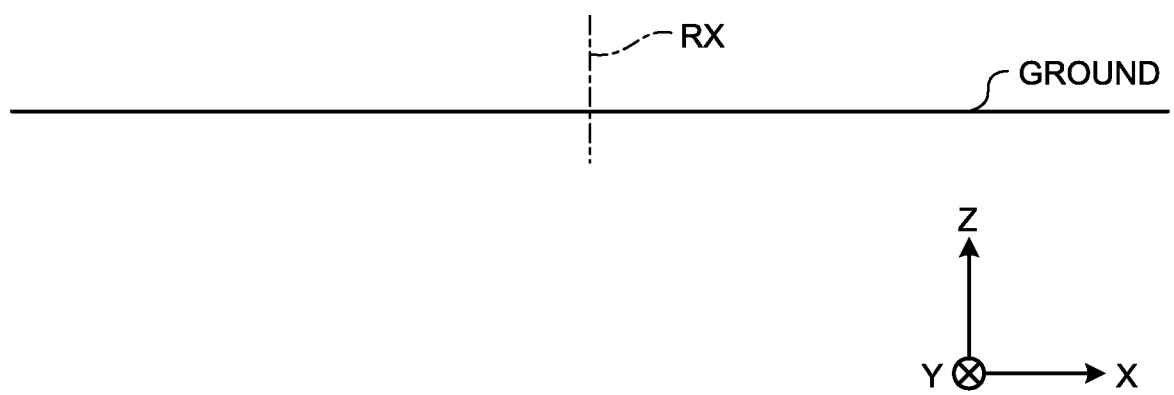
Figure 12:
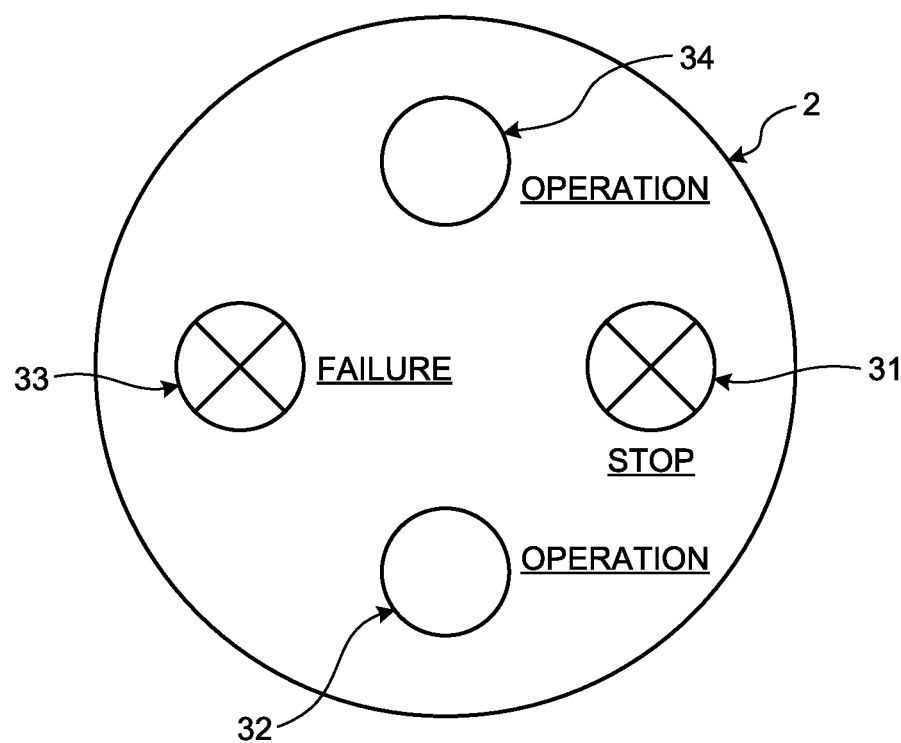
FIG. 12 is a schematic diagram illustrating an example of the control method of the vertical take-off and landing spacecraft according to the first embodiment.

FIGS. 11 and 12 are schematic diagrams illustrating an example of a control method of the vertical take-off and landing rocket 1 according to the present embodiment. FIG. 11 is a side view of the vertical take-off and landing rocket 1. FIG. 12 is a diagram of the vertical take-off and landing rocket 1 as viewed from the base part 2B side. As illustrated in FIGS. 11 and 12, when the engine 33 fails among the four engines 31, 32, 33 and 34, the engine 31 disposed point-symmetrically with the engine 33 with respect to the central axis AX is stopped. As a result, deterioration of thrust balance is suppressed. The posture of the body 2 is maintained so that the central axis AX and the reference axis RX are parallel to each other.

When the engine 33 fails and the engine 33 does not generate a jet flow (or when it is not possible to adjust the direction of the engine 33), if all other engines 31, 32, and 34 continue to operate, for example, there is a high possibility that the posture of the vertical take-off and landing rocket 1 collapses, as indicated by an arrow R in FIG. 9, so that the posture angle θ increases. In this case, there is a high possibility that the vertical take-off and landing rocket 1 may not maintain a desired posture and may not land vertically.

In the present embodiment, when the engine 33 fails, the operation of the engine 31 disposed point-symmetrically with the engine 33 is stopped. As a result, the thrust balance is maintained, and the collapse of the posture of the vertical take-off and landing rocket 1 is suppressed.

In this example, an example in which the engine 31 is stopped when the engine 33 fails during operation of the engine 31, the engine 32, the engine 33 and the engine 34 has been described. In the present embodiment, during operation of the engine 31, the engine 32, the engine 33 and the engine 34, when the engine 31 fails, the engine 33 is stopped. During operation of the engine 31, the engine 32, the engine 33 and the engine 34, when the engine 32 fails, the engine 34 is stopped. During operation of the engine 31, the engine 32, the engine 33 and the engine 34, when the engine 34 fails, the engine 32 is stopped.

That is, when an abnormal signal AS indicative of an abnormality of one engine 31 (or the engine 33) of the two engines 31 and 33 disposed on both sides of the central axis AX of the body 2 in the X-axis direction is acquired, the engine control unit 15 outputs the stop signal CS which stops the other engine 33 (or the engine 31). When an abnormal signal AS indicative of an abnormality of one engine 32 (or the engine 34) of the two engines 32 and 34 disposed on both sides of the central axis AX of the body 2 in the Y-axis direction is acquired, the engine control unit 15 outputs a stop signal CS which stops the other engine 34 (or the engine 32).

In the present embodiment, when an abnormal signal AS indicative of an abnormality (failure) of the engine 33 is acquired, the engine control unit 15 immediately outputs a stop signal CS for stopping the engine 31. However, there is a possibility of an occurrence of a time lag (delay) from the acquisition of the abnormal signal AS indicative of the failure of the engine 33 to the output of the stop signal CS for stopping the engine 31. When a time lag occurs, during a period from the time of failure of the engine 33 to the stop of the operation of the engine 31, in a state in which no jet flow is generated from the engine 33 (or a state in which the direction of the engine 33 may not be adjusted), the jet flow is generated from the engine 31. In this case, a period during which the balance of thrust is lost occurs. Then, even if the engine 31 is stopped when the engine 33 fails, for example, there is a possibility of the collapse of the posture of the vertical take-off and landing rocket 1, as indicated by an arrow R in FIG. 9.

Therefore, in the present embodiment, when an abnormality occurs in the engine 33, the actuator control unit 16 controls the actuator 6 of the normally operating engines 32 and 34 different from the abnormal engine 33 and the engine 31 stopped by the stop signal CS, so that the central axis AX of the body 2 and the ground are orthogonal to each other. That is, the actuator control unit 16 adjusts the directions of the engine 32 and the engine 34 which are normally operating, and recovers the posture of the vertical take-off and landing rocket 1 trying to collapse.

Figure 13:
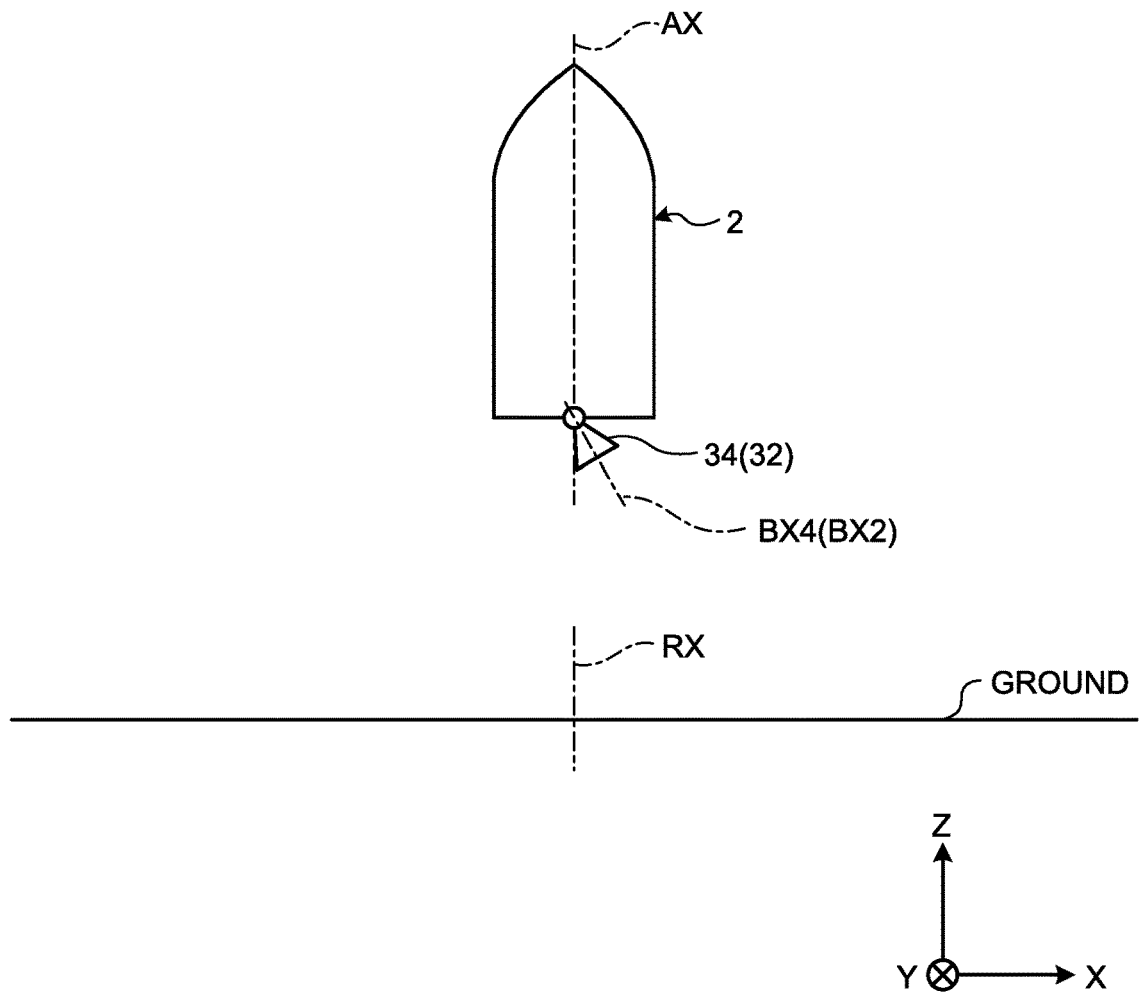
FIG. 13 is a schematic diagram illustrating an example of the control method of the vertical take-off and landing spacecraft according to the first embodiment.

FIG. 13 is a schematic diagram illustrating an example of a control method of the vertical take-off and landing rocket 1 according to the present embodiment. The actuator control unit 16 outputs a rudder angle signal RS for adjusting the direction of the normally operating engines 32 and 34 to the actuator 6 of the engine 32 and the actuator 6 of the engine 34 (step SP3).

Figure 14:
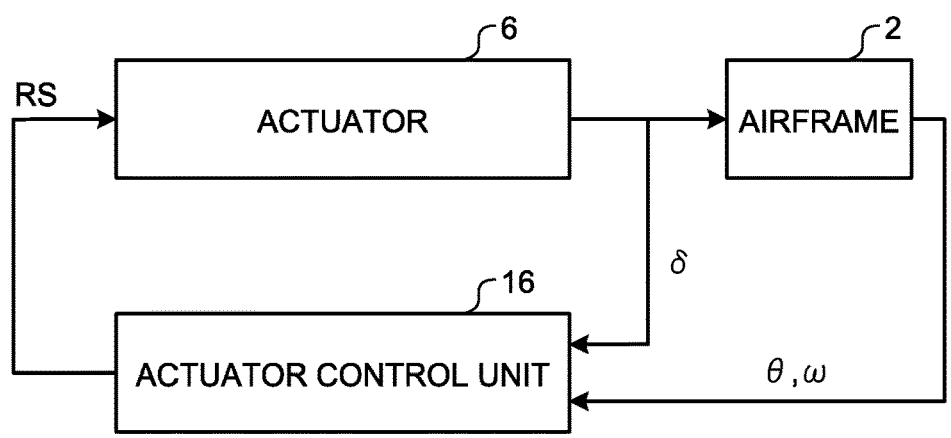
FIG. 14 is a block diagram illustrating an example of a control system including an actuator control unit according to the first embodiment.

FIG. 14 is a block diagram illustrating an example of a control system including the actuator control unit 16 according to the present embodiment. As illustrated in FIG. 14, in the present embodiment, the actuator control unit 16 outputs the rudder angle signal RS for adjusting the directions of the engine 32 and the engine 34 based on the rudder angle data RD indicative of the rudder angle δ of the engine 3, the posture angle data PD indicative of the posture angle θ of the body 2, and the posture angular velocity data SD indicative of the posture angular velocity ω of the body 2.

In the present embodiment, the actuator control unit 16 controls the actuator 6 of the engine 32 and the actuator 6 of the engine 34 using a stable manifold method of nonlinear optimal control.

Figure 15:
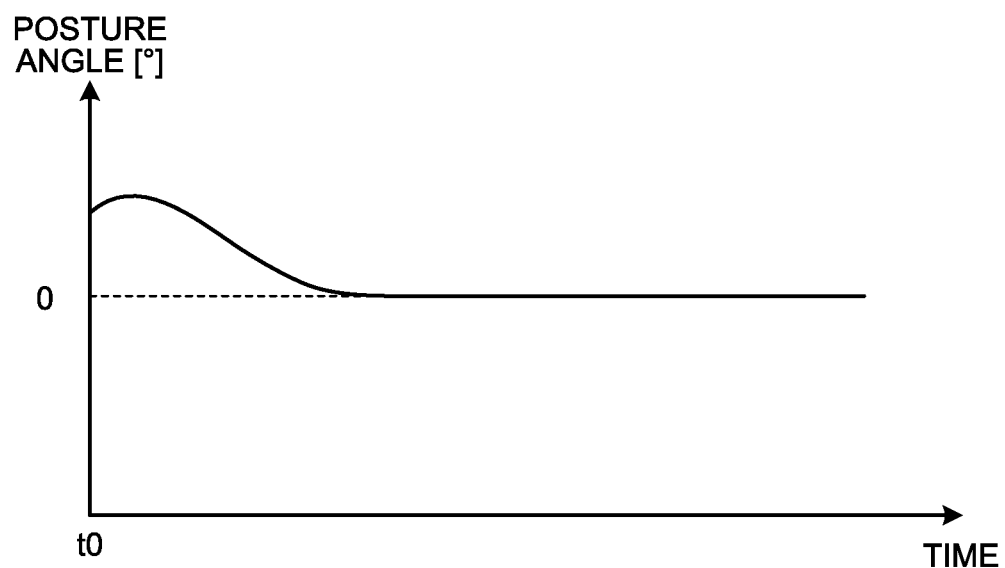
FIG. 15 is a diagram illustrating an example in which the direction of an engine is controlled using a stable manifold method of nonlinear optimal control according to the first embodiment.
Figure 15:
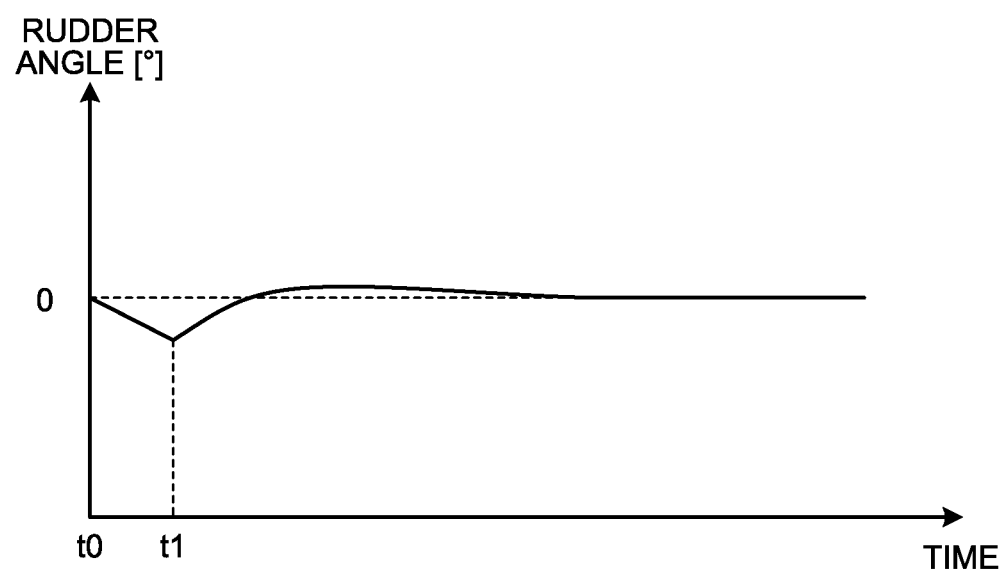

FIG. 15 illustrates an example which controls the directions (rudder angle δ) of the engine 32 and the engine 34 using the stable manifold method of the nonlinear optimal control according to this embodiment. An upper graph of FIG. 15 illustrates a relation between the elapsed time after the failure of the engine 33 and the posture angle θ of the body 2. A lower graph of FIG. 15 illustrates a relation between the elapsed time after the failure of the engine 33 and the directions (rudder angle δ) of the engine 32 and the engine 34. A vertical axis of the upper graph of FIG. 15 is the posture angle θ of the body 2. A vertical axis of the lower graph of FIG. 15 is the rudder angle δ of the engine 32 and the engine 34. The horizontal axes of the upper graph and the lower graph indicate the elapsed time from the time t0 at which the failure of the engine 33 occurs. The engine 33 is assumed to fail at the time t0.

When the engine 33 fails, the posture angle θ of the body 2 increases. After the failure of the engine 33, the rudder angle δ of the engine 32 and the engine 34 is adjusted. In the example illustrated in FIG. 15, after the directions (rudder angle δ) of the engine 32 and the engine 34 are adjusted so that the rudder angle δ decreases from 0 [°] from the time t0 (to indicate a negative value), the directions (rudder angle δ) of the engine 32 and the engine 34 are adjusted so that the rudder angle δ increases at the time t1. By using the stable manifold method of the nonlinear optimal control, the time between the time t0 and the time t1 is shortened. That is, by using the stable manifold method of the nonlinear optimal control, it is found that the timing at which the rudder angle δ of the engine 32 and the engine 34 adjusted to decrease from 0 [°] returns to increase becomes earlier. As a result, the posture angle θ of the body 2 quickly recovers to 0 [°].

Figure 16:
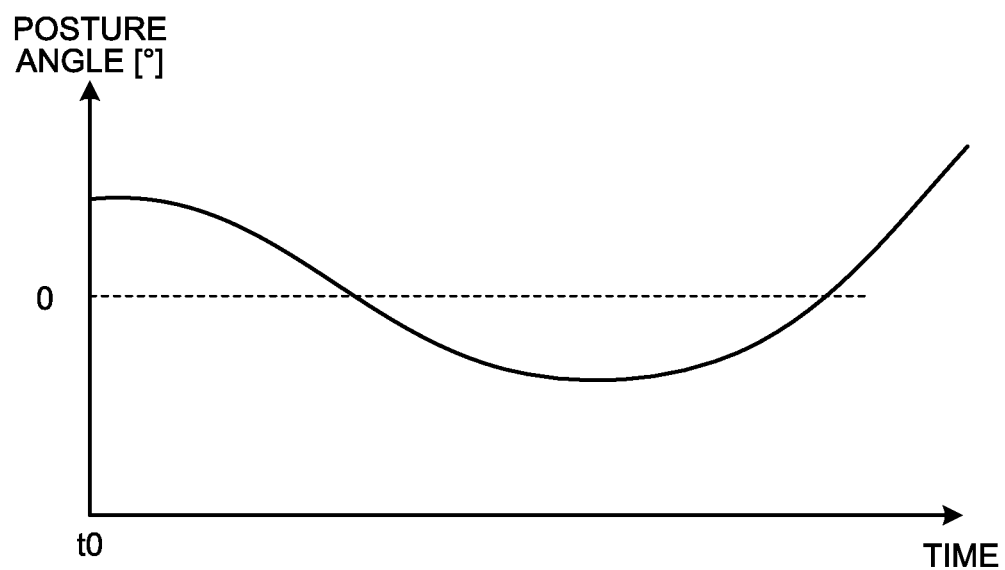
FIG. 16 is a diagram illustrating an example in which the direction of the engine is controlled using linear control according to a comparative example.
Figure 16:
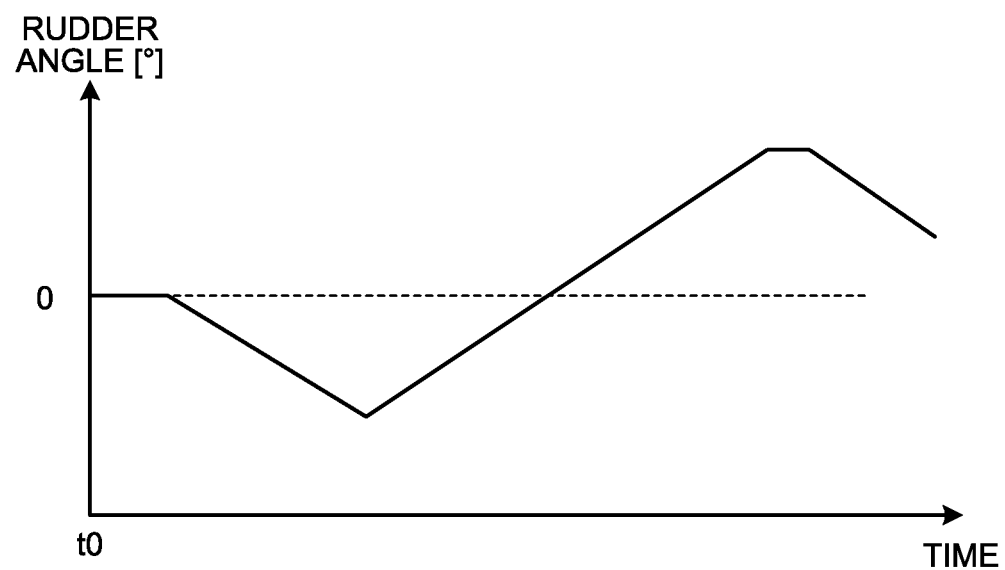

FIG. 16 is a diagram relating to a comparative example. FIG. 16 illustrates an example in which the directions (rudder angle δ) of the engine 32 and the engine 34 are controlled using linear control. An upper graph of FIG. 16 illustrates the relation between the elapsed time after the failure of the engine 33 and the posture angle θ of the body 2. A lower graph of FIG. 16 illustrates a relation between the elapsed time after the failure of the engine 33 and the directions (rudder angle δ) of the engine 32 and the engine 34. The vertical axis of the upper graph of FIG. 16 is the posture angle θ of the body 2. The vertical axis of the lower graph of FIG. 16 is the rudder angle δ of the engine 32 and the engine 34. The horizontal axes of the upper graph and the lower graph indicate the elapsed time from the time t0 at which the failure of the engine 33 occurs. The engine 33 is assumed to fail at the time t0.

There is a limit in the performance (driving velocity) of the actuator 6. Therefore, there is also a limit (restriction) in the amount of change (steering angular velocity) of the rudder angle δ per unit time which changes by the driving of the actuator 6. Then, when the linear control is executed, even if the actuator 6 is controlled so that the posture angle θ of the body 2 deviated from 0 [°] returns to 0 [°], the rudder angle speed does not catch up with the target velocity, and there is a high possibility of delay of the control.

As a result, as illustrated in the lower graph of FIG. 16, the rudder angle δ of the engine 32 and the engine 34 greatly deviates from 0 [°] to a negative value, or greatly deviates from 0 [°] to a positive value. At the same time, as illustrated in the upper graph of FIG. 16, there is a high possibility of instability of the posture angle θ of the body 2 without returning to 0 [°].

According to the present embodiment, the posture angle θ of the vertical take-off and landing rocket 1 quickly returns to 0 [°] by the stable manifold method of the nonlinear optimal control. Therefore, the vertical take-off and landing rocket 1 can land vertically in a desired posture (step SP4).

As described above, according to the present embodiment, when an abnormality occurs in the engine 33 among the plurality of engines 31, 32, 33 and 34, by the stop of the predetermined specific engine 31 among the plurality of operating engines 31, 32 and 34, the deterioration of the thrust balance is suppressed. Therefore, the vertical take-off and landing rocket 1 can land, while maintaining a desired posture.

In the present embodiment, the vertical take-off and landing rocket 1 is a reusable vertical take-off and landing rocket (reusable rocket). In the reusable rocket, if the desired posture is not maintained, the body 2 may be lost and there is a possibility of difficulty in reuse. According to the present embodiment, the loss of the body 2 of the vertical take-off and landing rocket 1 is suppressed.

As described above, by using the stable manifold method, it is more likely that the vertical take-off and landing rocket 1 can land vertically in a desired posture. However, if any one of the plurality of engines 3 fails, there is a possibility of difficulty in favorably controlling the posture of the vertical take-off and landing rocket 1 even by using the stable manifold method. The inventor of the present invention has found that, in a situation in which an abnormality occurs in any one of the plurality of engines 3 and it is difficult to perform the favorable posture control even if the stable manifold method is used, it is possible to perform the favorable posture control by intentionally stopping the normal engine 3 located at the position corresponding to the abnormal engine 3. As a result, the vertical take-off and landing rocket 1 can take off and land in a desired posture.

In the present embodiment, the engine 3 is disposed around the central axis AX of the body 2. The engine control unit 15 outputs the stop signal CS so that the body 2 is in a desired posture. In the present embodiment, when a certain engine 3 fails, the index data indicative of the engine 3 to be stopped is determined in advance so that the central axis AX and the reference axis RX are parallel to each other. According to the index data, when a certain engine 3 (the engine 33 in this example) fails, by stopping the specific engine 3 (the engine 31 in this example), the vertical take-off and landing rocket 1 can land in a desired posture.

In the present embodiment, the engine 31 and the engine 33 are disposed on both sides of the central axis AX of the body 2 in the X-axis direction, and the engine 32 and the engine 34 are disposed on both sides of the central axis AX of the body 2 in the Y-axis direction. When the engine 33 fails, the engine 31 is stopped. When the engine 31 fails, the engine 33 is stopped. When the engine 34 fails, the engine 32 is stopped. When the engine 32 fails, the engine 34 is stopped. As a result, the vertical take-off and landing rocket 1 can land, while maintaining a desired posture, and while suppressing imbalance of thrust.

In the present embodiment, the distance between the central axis AX of the body 2 and the engine 31 is equal to the distance between the central axis AX of the body 2 and the engine 33. When the engine 33 (or the engine 31) fails, the engine 31 (or the engine 33) disposed point-symmetrically with respect to the central axis AX of the body 2 is stopped. Further, the distance between the central axis AX of the body 2 and the engine 32 is equal to the distance between the central axis AX of the body 2 and the engine 34. When the engine 34 (or the engine 32) fails, the engine 32 (or the engine 34) disposed point-symmetrically with respect to the central axis AX of the body 2 is stopped. As a result, the vertical take-off and landing rocket 1 can land, while maintaining a desired posture, and while suppressing imbalance of thrust.

In the present embodiment, even if the engine 33 fails and the engine 31 is stopped, the operation of the engine 32 and the operation of the engine 34 are maintained. Therefore, the vertical take-off and landing rocket 1 can obtain the thrust. A plurality of operating engines 32 and 34 is disposed to surround the central axis AX of body 2. As a result, a well-balanced thrust is obtained.

In the present embodiment, the operating engine 32 and the operating engine 34 are disposed point-symmetrically with respect to the central axis AX of the body 2. As a result, a well-balanced thrust is obtained by the jet flow generated by each of the engine 32 and the engine 34 which are point-symmetrically disposed.

In the present embodiment, the directions (rudder angle δ) of the operating engines 32 and 34 are adjusted by the actuator 6. The directions (rudder angle δ) of the operating engines 32 and 34 are controlled by the actuator control unit 16. The actuator control unit 16 controls the actuator 6 of the engine 32 and the actuator 6 of the engine 34 that are normally operated so that the central axis AX of the body 2 and the ground are orthogonal to each other. As a result, the directions of the engine 32 and the engine 34 generating the jet flow are adjusted, and the vertical take-off and landing rocket 1 can land, while maintaining the desired posture.

In the present embodiment, the directions of the operating engines 32 and 34 are adjusted based on the rudder angle data RD indicative of the rudder angle δ of the engine 3, the posture angle data PD indicative of the posture angle θ of the body 2, and the posture angular velocity data SD indicative of the posture angular velocity ω of the body 2. Thus, the vertical take-off and landing spacecraft 1 can land, while maintaining a desired posture.

Further, in the present embodiment, the distance L1, the distance L2, the distance L3, and the distance L4 are set to be equal to one another. The distance L1 and the distance L3 may be different from each other. The distance L2 and the distance L4 may be different from each other. For example, in a case where the distance L2 and the distance L4 are different from each other, even when the engine 33 fails and the engine 31 is stopped, by optimally adjusting the directions of the operating engine 32 and 34 respectively, even if the distance L2 is different from the distance L4, the vertical take-off and landing rocket 1 can land, while maintaining a desired posture, and while suppressing imbalance of thrust. This also applies to the following embodiments.

Further, in the present embodiment, the central axis AX, the central axis BX1 and the central axis BX3 are disposed on a single imaginary line in a state in which the engine 31 and the engine 33 are disposed at the initial position. The central axis AX and the central axis BX1 may be disposed on a single virtual line, and the central axis BX3 may be separated from the imaginary line. That is, the engine 31 and the engine 33 may not be disposed point-symmetrically with respect to the central axis AX of the body 2. Similarly, the engine 32 and the engine 34 may not be disposed point-symmetrically with respect to the central axis AX of the body 2. This also applies to the following embodiments.

That is, in the present embodiment, in a case where the number of the engines 3 provided in the body 2 is four, the engines 3 are symmetrically disposed, but these four engines 3 may not be disposed symmetrically.

<Second Embodiment>

A second embodiment will be described. In the following description, the same or equivalent constituent parts as those in the above-described embodiment are denoted by the same reference numerals, and the description thereof will be simplified or omitted.

Figure 17:
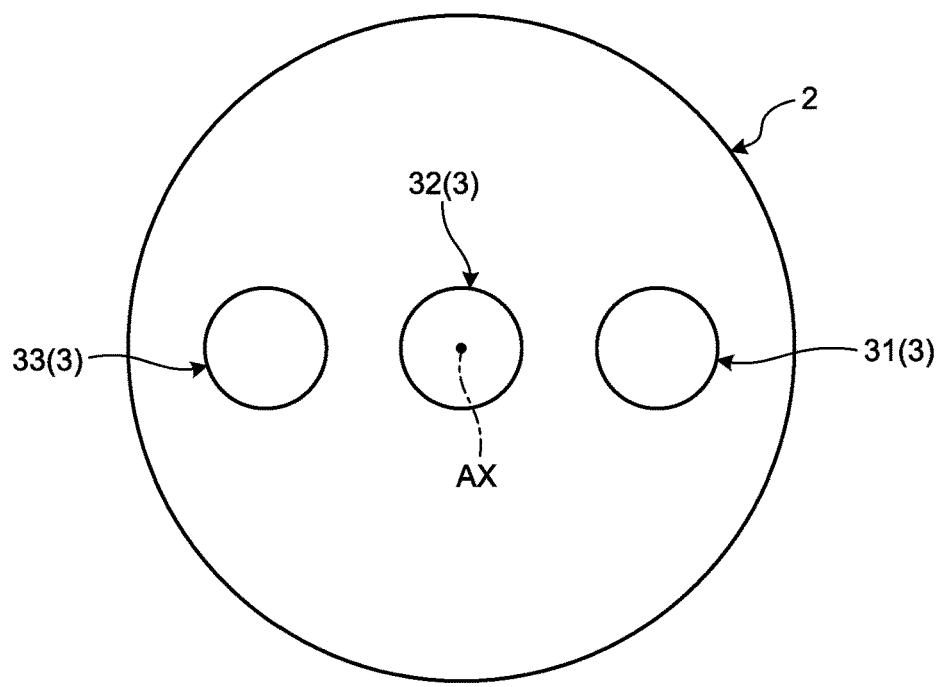
FIG. 17 is a schematic diagram illustrating an example of a vertical take-off and landing spacecraft according to a second embodiment.

FIG. 17 is a diagram of the vertical take-off and landing rocket 1 according to the present embodiment as viewed from the base part 2B side. As illustrated in FIG. 17, in the present embodiment, three engines 3 are disposed on the body 2. The engine 3 includes an engine 31 and an engine 33 disposed on both sides of a central axis AX of the body 2, and an engine 32 disposed between the engine 31 and the engine 33.

The engine 32 is disposed on the central axis AX. In the plane orthogonal to the central axis AX, the distance between the central axis AX and the engine 31 is equal to the distance between the central axis AX and the engine 33. Further, the distance between the central axis AX and the engine 31 may be different from the distance between the central axis AX and the engine 33.

During operation of the engine 31, the engine 32 and the engine 33, when an abnormal signal AS indicative of an abnormality of the engine 33 is acquired, the engine control unit 15 outputs the stop signal CS so that the engine 31 stops. In a state in which the engine 33 fails and the engine 31 is stopped, the engine 32 operates.

As described above, three engines 3 may be used. In a state in which the engine 33 fails and the engine 31 is stopped, a thrust is obtained by the engine 32 disposed on the central axis AX of the body 2. Therefore, the vertical take-off and landing rocket 1 can land, while maintaining a desired posture, and while suppressing imbalance of thrust.

<Third Embodiment>

A third embodiment will be described. In the following description, the same or equivalent constituent parts as those in the above-described embodiment are denoted by the same reference numerals, and the description thereof will be simplified or omitted.

Figure 18:
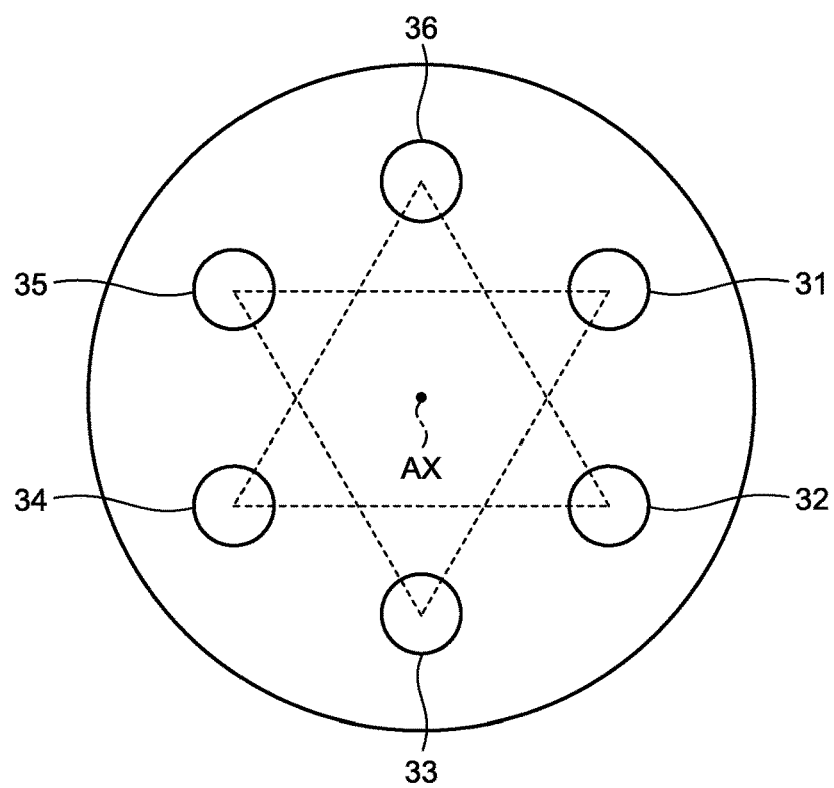
FIG. 18 is a schematic diagram illustrating an example of a vertical take-off and landing spacecraft according to a third embodiment.

FIG. 18 is a diagram of the vertical take-off and landing rocket 1 according to the present embodiment as viewed from the side of the base part 2B side. As illustrated in FIG. 18, in this embodiment, the engine 3 includes six engines 3 (an engine 31, an engine 32, an engine 33, an engine 34, an engine 35 and an engine 36) disposed around the central axis AX of the body 2 at equal intervals.

In a plane orthogonal to the central axis AX, the distances between the central axis AX and each of the plurality of engines 3 are equal to one another. Further, the distances between the central axis AX and each of the plurality of engines 3 may be different from each other.

For example, during operation of the engine 31, the engine 32, the engine 33, the engine 34, the engine 35 and the engine 36, when an abnormal signal AS indicative of an abnormality of the engine 31 is acquired, the engine control unit 15 outputs the stop signal CS so that the engine 33 and the engine 35 stop. In a state in which the engine 31 fails and the engine 33 and the engine 35 stop, the engine 32, the engine 34, and the engine 36 are operated.

The engine 31, the engine 33 and the engine 35 that do not generate the jet flow are disposed around the central axis AX of the body 2 at equal intervals. The operating engines 32, 34 and 36 which generate the jet flow are disposed around the central axis AX of the body 2 at equal intervals. That is, a plurality (three) of operating engines 3 (the engine 32, the engine 34, and the engine 36) is disposed to surround the central axis AX of the body 2.

As described above, six engines 3 may be used. Each of the engine 31, the engine 33, and the engine 35 disposed around the central axis AX of the body 2 at equal intervals do not generate a jet flow, and when the jet flow is generated by the engine 32, the engine 34 and the engine 36 other than the engine 31, the engine 33 and the engine 35, the vertical take-off and landing rocket 1 can land, while maintaining a desired posture, and while suppressing imbalance of thrust.

Further, a plurality of engines 32, 34 and 36 that generate the jet flow is disposed to surround the central axis AX of the body 2. As a result, a well-balanced thrust is obtained.

<Fourth Embodiment>

A fourth embodiment will be described. In the following description, the same or equivalent constituent parts as those in the above-described embodiment are denoted by the same reference numerals, and the description thereof will be simplified or omitted.

Figure 19:
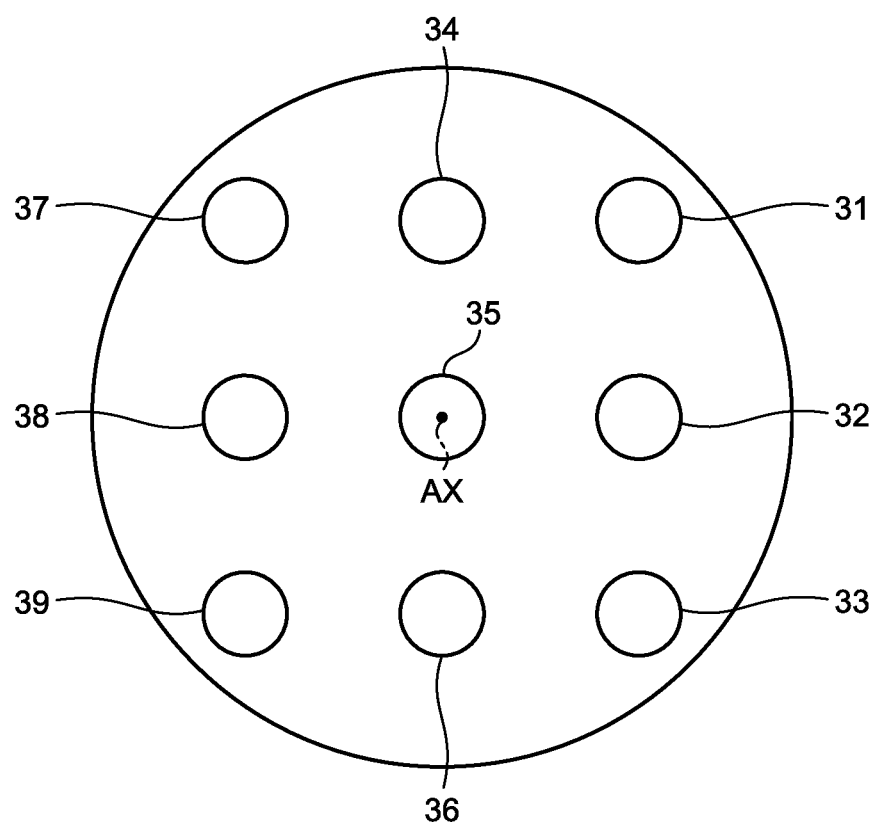
FIG. 19 is a schematic diagram illustrating an example of a vertical take-off and landing spacecraft according to a fourth embodiment.

FIG. 19 is a diagram of the vertical take-off and landing rocket 1 according to the present embodiment as seen from the base part 2B side. As described in the first, second and third embodiments, at least three engines 3 may be disposed. The number of engines 3 may be three, four, five, six, seven, or eight.

FIG. 19 illustrates an example in which nine engines 3 are provided. The engine 3 includes an engine 31 and an engine 39 disposed on both sides of a central axis AX of the body 2, an engine 32 and an engine 38 disposed on both sides of the central axis AX of the body 2, an engine 33 and an engine 37 disposed on both sides of the central axis AX of the body 2, an engine 34 and an engine 36 disposed on both sides of the central axis AX of the body 2, and an engine 35 disposed on the central axis AX of the body 2.

For example, during operation of the engine 31, the engine 32, the engine 33, the engine 34, the engine 35, the engine 36, the engine 37, the engine 38 and the engine 39, when an abnormal signal AS indicative of an abnormality of the engine 31 is acquired, the engine control unit 15, for example, outputs a stop signal CS so that the engine 39 stops. In a state in which the engine 31 fails and the engine 39 is stopped, the engine 32, the engine 33, the engine 34, the engine 35, the engine 36, the engine 37, and the engine 38 are operated.

Further, when the abnormal signal AS indicative of the abnormality of the engine 31 is acquired, the engine control unit 15 may, for example, output the stop signal CS so that the engine 33, the engine 37, and the engine 39 stop. In a state in which the engine 31 fails and the engine 33, the engine 37, and the engine 39 stop, the engine 32, the engine 34, the engine 35, the engine 36, and the engine 38 are operated.

For example, during operation of the engine 31, the engine 32, the engine 33, the engine 34, the engine 35, the engine 36, the engine 37, the engine 38 and the engine 39, when an abnormal signal AS indicative of the abnormality of the engine 32 and the engine 36 is acquired, the engine control unit 15, for example, may output the stop signal CS so that the engine 34 and the engine 38 stop. In a state in which the engine 32 and the engine 36 fail and the engine 34 and the engine 38 stop, the engine 31, the engine 33, the engine 35, the engine 37, and the engine 39 are operated.

As described above, nine engines 3 may be used. When an abnormal signal AS indicative of an abnormality of a certain engine 3 among the nine engines 3 is acquired, the engine control unit 15 outputs the stop signal CS to the specific engine 3 so that the central axis AX of the body 2 and the ground are orthogonal to each other.

As described above, when a certain engine 3 fails, a plurality of combinations of patterns of the engine 3 to be stopped by outputting the stop signal CS may be determined. In this example, when the engine 31 fails, a first pattern for stopping the engine 39, and a second pattern for stopping the engine 33, the engine 37, and the engine 39 are determined in advance and stored in the storage unit 17.

Further, as described above, there may be a plurality of failed engines 3 (in this example, the engine 32 and the engine 36). A plurality of combinations of patterns of the engine 3 to be stopped may be determined in advance and stored in the storage unit 17, in accordance with the position and number of the failed engine 3.

REFERENCE SIGNS LIST

1 VERTICAL TAKE-OFF AND LANDING SPACECRAFT (VERTICAL TAKE-OFF AND LANDING ROCKET)
2 BODY
2A NOSE PART
2B BASE PART
3 ENGINE
4 THRUST DEFLECTION NOZZLE
5 GIMBAL DEVICE
6 ACTUATOR
7 CONTROL SYSTEM
8 ENGINE ABNORMALITY DETECTING UNIT
10 CONTROL DEVICE
11 ABNORMAL SIGNAL ACQUIRING UNIT
12 RUDDER ANGLE DATA ACQUIRING UNIT
13 POSTURE ANGLE DATA ACQUIRING UNIT
14 POSTURE ANGULAR VELOCITY DATA ACQUIRING UNIT
15 ENGINE CONTROL UNIT
16 ACTUATOR CONTROL UNIT
17 STORAGE UNIT
21 RUDDER ANGLE DETECTING UNIT
22 POSTURE ANGLE DETECTING UNIT
23 POSTURE ANGULAR VELOCITY DETECTING UNIT
31 TO 39 ENGINES
81 TO 84 ENGINE ABNORMALITY DETECTING UNIT
AS ABNORMAL SIGNAL
AX, BX, BX1 TO BX4 CENTRAL AXES
CS STOP SIGNAL
CX AXIS
PD POSTURE ANGLE DATA
RD RUDDER ANGLE DATA
RS RUDDER ANGLE SIGNAL
RX REFERENCE AXIS
SD POSTURE ANGULAR VELOCITY DATA
$\delta$ RUDDER ANGLE
$\theta$ POSTURE ANGLE
$\omega$ POSTURE ANGULAR VELOCITY

The invention claimed is:

1. A vertical take-off and landing spacecraft comprising:
a body;
a plurality of engines provided in the body to produce a jet flow and generate thrust;
a gimbal device which is provided in each of the plurality of engines and includes an actuator capable of adjusting a direction of the engine;
an actuator control unit configured to control the actuator;
an abnormal signal acquiring unit configured to acquire an abnormal signal indicative of a presence of an abnormal engine among the plurality of engines; and
an engine control unit configured to output a stop signal which stops a specific engine among a plurality of operating engines based on the abnormal signal,
wherein the actuator control unit controls the actuator of a normally operating engine different from the abnormal engine and the specific engine stopped by the stop signal, so that the central axis of the body and a ground are orthogonal to each other.

2. The vertical take-off and landing spacecraft according to claim 1,
wherein the engines are disposed around a central axis of the body, and
the engine control unit outputs the stop signal so that the central axis of the body is orthogonal to the ground.

3. The vertical take-off and landing spacecraft according to claim 2,
wherein the engines include a first engine and a second engine disposed on both sides of the central axis of the body, and
when an abnormal signal indicative of an abnormality of the first engine is acquired during operation of an engine other than the first engine and the second engine, the engine control unit outputs a stop signal which stops the second engine.

4. The vertical take-off and landing spacecraft according to claim 3,
wherein a distance between the central axis of the body and the first engine is equal to a distance between the central axis of the body and the second engine.

5. The vertical take-off and landing spacecraft according to claim 3,
wherein the other engine is disposed between the first engine and the second engine.

6. The vertical take-off and landing spacecraft according to claim 3,
wherein a plurality of other engines is disposed to surround the central axis of the body.

7. The vertical take-off and landing spacecraft according to claim 6,
wherein at least two engines of other engines are disposed point-symmetrically with respect to the central axis of the body.

8. The vertical take-off and landing spacecraft according to claim 2,
wherein the engines include a first engine, a second engine and a third engine which are disposed around the central axis of the body at equal intervals, and
when an abnormal signal indicative of an abnormality of the first engine is acquired during operation of an engine other than the first engine, the second engine and the third engine, the engine control unit outputs a stop signal which stops the second engine and the third engine.

9. The vertical take-off and landing spacecraft according to claim 8,
wherein a plurality of other engines is disposed to surround the central axis of the body.

10. The vertical take-off and landing spacecraft according to claim 9,
wherein at least two engines of other engines are disposed point-symmetrically with respect to the central axis of the body.

11. The vertical take-off and landing spacecraft according to claim 1 further comprising:
a rudder angle data acquiring unit configured to acquire rudder angle data indicative of an angle formed between an axis parallel to a central axis of the body and the central axis of the engine;
a posture angle data acquiring unit configured to acquire posture angle data indicative of an angle formed between a reference axis orthogonal to the ground and the central axis of the body; and
a posture angular velocity data acquiring unit configured to acquire posture angular velocity data indicative of an angular velocity of the central axis of the body,
wherein the actuator control unit outputs a rudder angle signal for adjusting the direction of the engine, based on the rudder angle data, the posture angle data, and the posture angular velocity data.

12. A method of controlling a vertical take-off and landing spacecraft, the method comprising:
acquiring an abnormal signal which acquires an abnormal signal indicative of a presence of an abnormal engine among a plurality of engines provided in a body of the vertical take-off and landing spacecraft which produces a jet flow and generates a thrust;
outputting a stop signal for stopping a specific engine among a plurality of operating engines based on the abnormal signal; and
after acquiring the abnormal signal, controlling an actuator of a gimbal device of a normally operating engine different from the abnormal engine and the specific engine stopped by the stop signal, so that the central axis of the body and a ground are orthogonal to each other,
wherein the gimbal device is provided in each of the plurality of engines and includes the actuator, the actuator being capable of adjusting a direction of the engine.

* * * * *